US 9,445,132 B2

United States Patent
Guo et al.

(10) Patent No.: US 9,445,132 B2
(45) Date of Patent: Sep. 13, 2016

(54) TWO LEVEL LAST SIGNIFICANT COEFFICIENT (LSC) POSITION CODING

(71) Applicant: QUALCOMM Incorporated, San Diego, CA (US)

(72) Inventors: Liwei Guo, San Diego, CA (US); Marta Karczewicz, San Diego, CA (US); Joel Sole Rojals, La Jolla, CA (US); Wei-Jung Chien, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/021,589

(22) Filed: Sep. 9, 2013

(65) Prior Publication Data

US 2015/0071359 A1    Mar. 12, 2015

(51) Int. Cl.
| | |
|---|---|
| *G06K 9/72* | (2006.01) |
| *H04N 19/91* | (2014.01) |
| *H04N 19/60* | (2014.01) |
| *H04N 19/13* | (2014.01) |
| *H04N 19/129* | (2014.01) |
| *H04N 19/18* | (2014.01) |

(52) U.S. Cl.
CPC ............ *H04N 19/91* (2014.11); *H04N 19/129* (2014.11); *H04N 19/13* (2014.11); *H04N 19/18* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 8,964,849 B2* | 2/2015 | Nguyen ............... | H04N 19/196 375/240.18 |
| 2006/0023795 A1* | 2/2006 | Kim ........................... | 375/242 |
| 2009/0058695 A1* | 3/2009 | Bao et al. ................... | 341/107 |
| 2009/0089549 A1* | 4/2009 | Liu et al. .................... | 712/208 |
| 2012/0093226 A1* | 4/2012 | Chien et al. ............ | 375/240.16 |
| 2012/0140813 A1* | 6/2012 | Sole Rojals et al. .... | 375/240.02 |
| 2012/0140814 A1* | 6/2012 | Sole Rojals et al. .... | 375/240.02 |
| 2012/0147971 A1* | 6/2012 | Chien et al. ............ | 375/240.23 |
| 2012/0281768 A1 | 11/2012 | Matsuba et al. | |
| 2012/0328026 A1* | 12/2012 | Sole Rojals et al. .... | 375/240.18 |
| 2013/0003835 A1 | 1/2013 | Sole et al. | |

(Continued)

FOREIGN PATENT DOCUMENTS

| | | | |
|---|---|---|---|
| EP | 2595380 | * | 5/2013 |
| WO | 2011128303 A2 | | 10/2011 |
| WO | 2013001279 A2 | | 1/2013 |

OTHER PUBLICATIONS

Sole et al, Transform Coefficient Coding in HEVC, IEEE Transactions on Circuits and Systems for Video Technology, vol. 22, No. 12, Dec. 2012.*

(Continued)

*Primary Examiner* — Andrae S Allison
(74) *Attorney, Agent, or Firm* — Shumaker & Sieffert, P.A.

(57) ABSTRACT

In some examples, a video coder employs a two-level technique to code information that identifies a position within the block of transform coefficients of one of the coefficients that is a last significant coefficient (LSC) for the block according to a scanning order associated with the block of transform coefficients. For example, a video coder may code a sub-block position that identifies a position of one of the sub-blocks that includes the LSC within the block, and code a coefficient position that identifies a position of the LSC within the sub-block that includes the LSC.

39 Claims, 10 Drawing Sheets

(56) References Cited

U.S. PATENT DOCUMENTS

| | | | |
|---|---|---|---|
| 2013/0051459 A1* | 2/2013 | Kirchhoffer | H04N 19/50 375/240.07 |
| 2013/0114668 A1* | 5/2013 | Misra et al. | 375/240.02 |
| 2013/0114686 A1* | 5/2013 | Misra et al. | 375/240.03 |
| 2013/0215970 A1* | 8/2013 | Fang | H04N 19/70 375/240.18 |
| 2013/0336386 A1* | 12/2013 | Chong et al. | 375/240.02 |
| 2015/0071359 A1* | 3/2015 | Guo et al. | 375/240.18 |

OTHER PUBLICATIONS

Sze, V.; Budagavi, M., "High Throughput CABAC Entropy Coding in HEVC," in Circuits and Systems for Video Technology, IEEE Transactions on , vol. 22, No. 12, pp. 1778-1791, Dec. 2012.*

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Bross, et al., "Editors' proposed corrections to HECV version 1," 13th Meetings; Incheon, KR; Apr. 18-26, 2013, JCTVC-M0432_v3, 310 pp.

ITU-T H.263, Series H: Audiovisual and Multimedia Systems, Infrastructure of audiovisual services—Coding of moving video, Advanced video coding for generic audiovisual services, The International Telecommunication Union., Jan. 2005, 226 pp.

* cited by examiner

TWO LEVEL LAST SIGNIFICANT COEFFICIENT (LSC) POSITION CODING

TECHNICAL FIELD

This disclosure relates to video coding and compression, and more particularly, techniques for coding transform coefficients when coding video data.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive and store digital video information more efficiently.

An encoder-decoder (codec) applies video compression techniques to perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures alternatively may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates generally to techniques for coding a position of a last significant coefficient (LSC) in a block of transform coefficients during video coding. This disclosure describes techniques for coding the LSC position for a block that include coding two levels of information that, together, indicate the LSC position for the block. More particularly, the disclosure describes techniques for coding the LSC position for a block that include coding a sub-block position that identifies a position of a sub-block that includes the LSC within the block, and coding an LSC position that identifies a position of the LSC within the sub-block. The two-level LSC position coding techniques of this disclosure may provide improved coding efficiency relative to single level LSC position signaling techniques, e.g., in which the LSC position within the block as a whole is signaled.

In one example, a method of decoding a block of transform coefficients associated with a block of video data during a video decoding process, wherein the block of transform coefficients includes a plurality of sub-blocks, comprises decoding information that identifies a position within the block of transform coefficients of one of the coefficients that is a last significant coefficient (LSC) for the block according to a scanning order associated with the block of transform coefficients. Decoding the information comprises decoding a sub-block position that identifies a position of one of the sub-blocks that includes the LSC within the block, and decoding a coefficient position that identifies a position of the LSC within the sub-block that includes the LSC. The method further comprises decoding the block of transform coefficients based on the position of the LSC.

In another example, a method of encoding a block of transform coefficients associated with a block of video data during a video encoding process, wherein the block of transform coefficients includes a plurality of sub-blocks, comprises encoding information that identifies a position within the block of transform coefficients of one of the coefficients that is a last significant coefficient (LSC) for the block according to a scanning order associated with the block of transform coefficients. Encoding the information comprises encoding a sub-block position that identifies a position of one of the sub-blocks that includes the LSC within the block, and encoding a coefficient position that identifies a position of the LSC within the sub-block that includes the LSC. The method further comprises encoding the block of transform coefficients based on the position of the LSC.

In another example, a device comprises a video coder configured to code a block of transform coefficients associated with a block of video data during a video coding process, wherein the block of transform coefficients includes a plurality of sub-blocks. The video coder is configured to code information that identifies a position within the block of transform coefficients of one of the coefficients that is a last significant coefficient (LSC) for the block according to a scanning order associated with the block of transform coefficients. To code the information, the video coder is configured to code a sub-block position that identifies a position of one of the sub-blocks that includes the LSC within the block, and code a coefficient position that identifies a position of the LSC within the sub-block that includes the LSC. The video coder is further configured to code the block of transform coefficients based on the position of the LSC.

In another example, a device for coding a block of transform coefficients associated with a block of video data during a video decoding process, wherein the block of transform coefficients includes a plurality of sub-blocks, comprises means for coding information that identifies a position within the block of transform coefficients of one of the coefficients that is a last significant coefficient (LSC) for the block according to a scanning order associated with the block of transform coefficients. The means for coding the information comprises means for coding a sub-block position that identifies a position of one of the sub-blocks that includes the LSC within the block, and means for coding a coefficient position that identifies a position of the LSC within the sub-block that includes the LSC. The device further comprises means for coding the block of transform coefficients based on the position of the LSC.

In another example, a computer-readable storage medium has instructions stored thereon that, when executed by one or more processors of a video coder configured to code a block of transform coefficients associated with a block of video data during a video decoding process, wherein the block of transform coefficients includes a plurality of sub-blocks, cause the video coder to code information that identifies a position within the block of transform coefficients of one of the coefficients that is a last significant coefficient (LSC) for the block according to a scanning order associated with the block of transform coefficients. The instructions that cause the video coder to code the information comprise instructions that cause the video coder to code a sub-block position that identifies a position of one of the sub-blocks that includes the LSC within the block, and code a coefficient position that identifies a position of the LSC within the sub-block that includes the LSC. The instructions further cause the video coder to code the block of transform coefficients based on the position of the LSC.

The details of one or more examples are set forth in the accompanying drawings and the description below. Other features, objects, and advantages will be apparent from the description and drawings, and from the claims.

DETAILED DESCRIPTION

Figure 1:
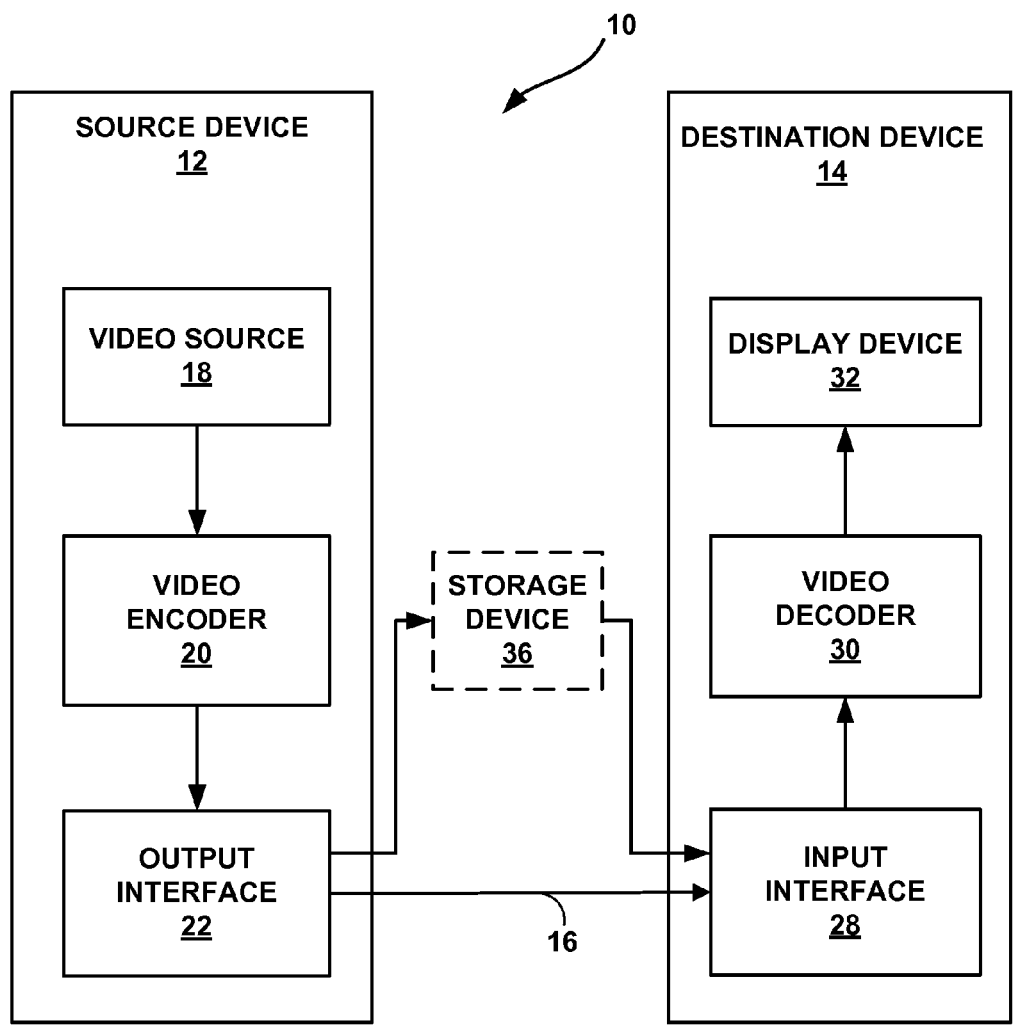
FIG. 1 is a block diagram illustrating an example video coding system that may utilize the techniques of this disclosure.

"Video coding" or "coding" may refer generally to either or both of video encoding, e.g., by a video encoder, or video decoding, e.g., by a video decoder. For video coding, a video coder, e.g., video encoder or video decoder, may partition a video frame or picture into a plurality of blocks, and perform a variety of operations on the blocks of video data. For example, for video coding according to the High Efficiency Video Coding (HEVC) standard presently under development, for example, a video frame may be partitioned into coding units (CUs), prediction units (PUs), and transform units (TUs). A CU generally refers to an image region that serves as a basic unit to which various coding tools are applied for video compression. A CU typically has a square geometry, and may be considered to be similar to a so-called "macroblock" as defined according to other video coding standards, such as, for example, ITU-T H.264 (H.264).

To achieve better coding efficiency, a CU may have a variable size depending on the video data it contains. That is, a CU may be partitioned, or "split," into smaller blocks, or sub-CUs, each of which may also be referred to as a CU. In addition, each CU that is not split into sub-CUs may be further partitioned into one or more PUs and TUs for purposes of prediction and transform of the CU, respectively.

PUs may be considered to be similar to so-called partitions of a block according to other video coding standards, such as, e.g., H.264. Specifically, PUs of a CU are the basis on which prediction for the CU is performed to produce "residual" coefficients. Residual coefficients of a CU represent a difference between video data of the CU and predicted data for the CU determined using one or more PUs of the CU. In particular, the one or more PUs specify how the CU is partitioned for the purpose of prediction, and which prediction technique, or "mode," is used to predict the video data contained within each partition of the CU.

One or more TUs of a CU, on the other hand, specify partitions of a block of the residual coefficients of the CU on the basis of which a transform is applied to the block to produce a block of transformed residual coefficients for the CU. The one or more TUs may also be associated with a type of transform that is applied. The transform converts the residual coefficients from a pixel, or spatial, domain to a transform domain, such as, e.g., a frequency domain. In addition, the one or more TUs may specify parameters on the basis of which quantization is applied to the resulting block of transformed residual coefficients to produce a block of quantized transformed residual coefficients. For example, the transformed residual coefficients may be quantized to possibly reduce the amount of data used to represent the coefficients.

A CU generally includes one luminance component, denoted as "Y," and two chrominance components, denoted as "U" and "V." In other words, a given CU that is not further split into sub-CUs may include Y, U, and V components, each of which may be further partitioned into one or more PUs and TUs for purposes of prediction and transform of the CU, as previously described. For example, depending on the video sampling format, the size of the U and V components, in terms of a number of samples, may be the same as, or different than, the size of the Y component. As such, the techniques described herein with reference to prediction, transform, quantization, and coding may be performed for each of the Y, U, and V components of a given CU.

To encode a CU, a video encoder derives one or more predictors for the CU based on one or more PUs of the CU. A predictor is a reference block that contains predicted data for the CU, and is derived on the basis of a corresponding PU for the CU, as described above. For example, the PU may indicate a partition of the CU for which predicted data is to be determined, and a prediction mode used to determine the predicted data. The predictor can be derived either through intra (I) prediction (i.e., spatial prediction) or inter (P or B) prediction (i.e., temporal prediction) modes. Hence, some CUs may be intra-coded (I) using spatial prediction with respect to neighbouring reference blocks, or CUs, in the same frame, while other CUs may be inter-coded (P or B) with respect to reference blocks, or CUs, in other frames.

Upon identification of the one or more predictors based on the one or more PUs of the CU, a video encoder calculates a difference between the original video data of the CU corresponding to the one or more PUs and the predicted data for the CU contained in the one or more predictors. This difference, also referred to as a prediction residual, is represented using residual coefficients that correspond to pixel differences between portions of the CU specified by the one or more PUs and the one or more predictors, as previously described. The residual coefficients are generally arranged in a two-dimensional (2-D) array that corresponds to the one or more PUs of the CU.

To achieve further compression, the video encoder subsequently transforms the prediction residual, e.g., using a discrete cosine transform (DCT), integer transform, Karhunen-Loeve (K-L) transform, wavelet transform or another transform. Generally speaking, the transform converts the prediction residual, i.e., the residual coefficients, in the spatial domain to transformed residual coefficients in the transform domain, e.g., a frequency domain, as previously described. The transformed residual coefficients are also generally arranged in a two-dimensional (2D) array or block, e.g., transformed coefficient block, that corresponds to the one or more TUs of the CU. For still further compression, the transformed residual coefficients may be quantized to possibly reduce the amount of data used to represent the coefficients, as also described above.

To achieve still further compression, an entropy encoder may subsequently encode the resulting transformed residual coefficients using Context Adaptive Variable Length Coding (CAVLC), Context Adaptive Binary Arithmetic Coding (CABAC), or another entropy coding methodology. Entropy encoding may achieve this further compression by reducing or removing statistical redundancy inherent in the video data of the CU, as represented by the coefficients, relative to other CUs.

In H.264 and the emerging HEVC standard, when CABAC is used, positions of "significant," e.g., non-zero or sub-threshold, transformed residual coefficients within a block of transformed residual coefficients are coded prior to coding the values, or "levels," of the coefficients and/or related information. The process of coding the positions of the significant coefficients within the block is generally referred to as significance map (SM) coding. SM coding includes identifying the last significant coefficient (LSC) according to a coding scanning order associated with the block. SM coding further includes coding information identifying a position of the LSC within the block according to the scanning order associated with the block.

According to some techniques, such as those associated with the H.264 and HEVC video coding standards, a video coder may use any of a variety of scanning orders, such as zig-zag, diagonal, horizontal, and vertical, for SM coding. Example scanning orders are illustrated and discussed in greater detail below with respect to FIG. 4. Which significant coefficient is the LSC (according to the scanning order) for the block of transform coefficients is dependent on the scanning order is used by the video coder for SM coding the block of transform coefficients. Generally speaking, SM coding for a block of video data typically consumes a significant amount of the video bitrate used to code the block, and is a significant source of processing overhead, particularly at the video encoder. As already explained above, after the SM is coded for the block, a video coder codes the level of each significant transformed residual coefficient (e.g., represented as an absolute value and a sign) and/or related information. The significant coefficients of a block of transform coefficients may be coded according to the scanning order for the block.

In SM coding consistent with the HEVC standard, for a particular TU of a CU, a video coder initially codes values of two syntax elements, namely "Last_X" and "Last_Y," to signal a coordinate location of the LSC within the TU. In some examples, the location of the LSC within the TU may be referred to as a "last position" for the TU. Subsequently, the TU is partitioned, or divided, into 4×4 sub-blocks, or "sub-TUs" (e.g., a 64×64 coefficient TU may be divided into 256 4×4 sub-TUs), after which the SM and coefficient values of the TU may be coded using several coding passes, as described in greater detail below.

The above-described techniques relating to SM coding a block of transform coefficients, e.g., as proposed for HEVC, may have several drawbacks. As one example, coding values of syntax elements "Last_X" and "Last_Y" for a block of transform coefficients, or a TU, may, in some cases, require inclusion of a significant number of bits in the coded bitstream. For example, in cases where the TU corresponds to a relatively large block of video data, and where the location of the LSC within the TU according to the scanning order associated with the TU occurs relatively distant from the coordinate origin of the TU and/or relatively later in the scanning order, coding values of Last_X and Last_Y may require a relatively large number of bits in the coded bitstream.

This disclosure describes several techniques that may, in some cases, reduce or eliminate some of the drawbacks described above with reference to coding transform coefficients of blocks of video data, e.g., according to the HEVC standard. For example, the techniques of this disclosure may improve data compression of information used to indicate a position of the LSC, according to a scanning order associated with a block of transform coefficients for a block of video data, within the block. The techniques of this disclosure may, in some cases, reduce the amount of data (e.g., the number of bits) used to represent this information in the coded bitstream.

For example, this disclosure describes so-called "two-level" approaches to coding LSC position information for a block that includes a plurality of sub-blocks. In some examples, a video coder codes information indicating the location within the block of a particular one of the plurality of sub-blocks that includes the LSC. This particular sub-block may be referred to as a "last significant sub-block" for the block. Coding information to identify the location of the last significant sub-block within the block may be first level of a two-level approach according to this disclosure.

In such examples, a video coder may additionally code information that indicates a location of the LSC within the last significant sub-block. Coding information to identify the location of the LSC within the last significant sub-block may be second level of a two-level approach according to this disclosure. Two-level coding of the location of the last significant sub-block within the block and the location of the LSC within the last significant sub-block may require less bits in the bitstream than coding the location of the LSC within the entire block, e.g., according to the proposals for the HEVC standard. This reduction of bitrate may be particularly evident for relatively large blocks and/or in situations in which the LSC is located further from the coordinate origin, e.g., the upper left corner, of the block, and/or or later in the scanning order associated with the block.

HEVC techniques related to this disclosure are reviewed below. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, High Efficiency Video Coding (HEVC), mentioned above, is a new and upcoming video coding standard, developed by the Joint Collaboration Team on Video Coding (JCT-VC) of ITU-T Video Coding Experts Group (VCEG) and ISO/IEC Motion Picture Experts Group (MPEG). A recent draft of the HEVC standard, JCTVC-L1003, Benjamin Bross Woo-Jin Han, Jens-Ranier Ohm, Gary Sullivan, Ye-Kui Wang, "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, 12th Meeting: Geneva, C H, 14-23 Jan. 2013, is available from the following link:
http://phenix.it-sudparis.eu/jct/doc_end_user/documents/12_Geneva/wg11/JCTVC-L1003-v11.zip. Although the two-level approaches to coding and coding LSC position for a block are described herein the in context of CABAC coding according to HEVC, such techniques may be more generally applicable to any entropy coding and any video coding standard for which LSC information is coded for a block of transform coefficients.

FIG. 1 is a block diagram illustrating an example video encoding and decoding system 10 that may utilize various techniques of this disclosure for signaling LSC position for a block of transform coefficients. As described herein, the term "video coder" refers generically to both video encoders and video decoders. In this disclosure, the terms "video coding" or "coding" may refer generically to video encoding or video decoding.

As shown in FIG. 1, system 10 includes a source device 12 that provides encoded video data to be decoded at a later time by a destination device 14. In particular, source device 12 provides the video data to destination device 14 via a channel 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via channel 16. Channel 16 may comprise any type of medium or device capable of moving the encoded video data from source device 12 to destination device 14. In one example, channel 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output source device 12 to a storage device 36. Similarly, encoded data may be accessed from the storage device by destination device 14. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 36 may correspond to a file server or another intermediate storage device that may store the encoded video generated by source device 12.

Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and video decoder 30 of destination device 14 may be configured to apply techniques for signaling and coding positions of LSCs within blocks of transform coefficients during coding of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for two-level LSC position signaling may be performed by any digital video encoding and/or decoding device. Although generally the techniques of this disclosure are performed by a video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 to channel 16 or storage device 36.

Channel 16 may include transient media, such as a wireless broadcast or wired network transmission. Storage device 36 may include storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from channel 16 or storage device 36. The information may include syntax information defined by video encoder 20, which is also used by video decoder 30, that includes syntax elements that describe characteristics and/or processing of blocks and other coded units, e.g., slices, tiles, or GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard referenced in this disclosure. HEVC presumes several additional capabilities of video coding devices relative to devices configured to perform coding according to other processes, such as, e.g., ITU-T H.264/AVC. For example, whereas H.264 provides nine intra-prediction encoding modes, the HEVC test model (HM) may provide as many as thirty-five intra-prediction encoding modes.

In general, HEVC specifies that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs), and TUs are generally leaf-nodes of a RQT. Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to a leaf-CU and leaf-TU, respectively, unless noted otherwise. As discussed in greater detail below, the techniques described herein for signaling and coding LSC position of a block of transform coefficients may be applied to a block, e.g., TU, including a plurality of sub-blocks. The sub-blocks of the TU may be considered sub-blocks defined for scanning and coefficient coding purposes, although the sub-blocks are actually part of the same TU, which is a leaf node of data defined by the RQT.

A video sequence typically includes a series of pictures. As described herein, "picture" and "frame" may be used interchangeably. That is, a picture containing video data may be referred to as a video frame, or simply a "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. A PU having a size of 2N×2N represents an undivided CU, as it is the same size as the CU in which it resides. In other words, a 2N×2N PU is the same size as its CU. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Figure 2:
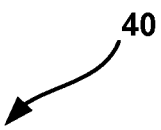
FIG. 2 is a conceptual diagram illustrating an example block of transform coefficients.

Video encoder 20 may use quadtree partitioning to partition the residual data of a non-partitioned CU into one or more residual video blocks. Each of the residual video blocks may be associated with a different transform unit (TU) of the CU. Video encoder 20 may apply one or more transforms to the residual video blocks associated with the TUs. A transform coefficient block may result from applying the transform to the residual video block associated with the TU. The transform coefficient block may be a 2D matrix of transform coefficients. FIG. 2 is a conceptual diagram that illustrates an example transform coefficient block.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix or block including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include syntax data. Syntax data generally includes data to be used by video decoder 30 to decode the video data, and may reflect parameters of the video encoding by video encoder 20. Syntax data may include block-based syntax data, picture-based syntax data, and GOP-based syntax data, to video decoder 30, e.g., in a picture header, a block header, a slice header, a GOP header, a parameter set, or a supplemental enhancement information (SEI) message, or other syntax structures. The GOP syntax data may describe a number of pictures in the respective GOP, and the picture syntax data may indicate an encoding/prediction mode used to encode the corresponding picture. Parameter sets may include sequence parameter sets (SPSs), picture parameter sets (PPSs), video parameter sets (VPSs), adaptive parameter sets (APSs). Syntax data may include LSC position information, as described herein.

Video encoder 20 may additionally decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use in inter-picture prediction.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30.

Video encoder 20 and video decoder 30 may operate substantially in accordance with the HEVC standard, as modified or supplemented to support coding LSC position data in accordance with the techniques of this disclosure. However, the techniques of this disclosure are not necessarily limited to any particular coding standard or technique. A draft of the HEVC standard currently, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which is downloadable from:
http://phenix.int-evry.fr/jct/doc_end_user/documents/11_Shanghai/wg11/JCTVC-K1003-v8.zip Another recent draft of the HEVC standard, mentioned above, is referred to as "HEVC Working Draft 10" or "WD10," and is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, C H, 14-23 January, 2013, which, as of Jun. 6, 2013, is downloadable from:
http://phenix.int-evrv.fr/jct/doc_end_user/documents/12_Geneva/wg11/JCTVC-L1003-v34.zip.

Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, K R, April 2013, which as of Jun. 7, 2013, is available from:
http://phenix.int-evrv.fr/jct/doc_end_user/documents/13_Incheon/wg11/JCTVC-M0432-v3.zip FIG. 2 is a conceptual diagram illustrating an example block 40 of transform coefficients, i.e., an example transform coefficient block. A transform coefficient block, such as transform coefficient block 40, may correspond to and be referred to as a TU, in some examples. Transform coefficient block 40 may result from video encoder 20 applying a transform to a block of residual video data resulting from intra- or inter-prediction of a block of video data. Transform coefficient block 40 may also result from video decoder 30 decoding an encoded bitstream generated by video encoder 20 when encoding transform coefficient block.

The transform coefficient values illustrated in transform coefficient block 40 are merely examples. The values illustrated in transform coefficient block 40 may be pre-quantization, or post-quantization values. In either case, as illustrated by FIG. 2, transforming a block of residual video data in the spatial domain to transform coefficients, e.g., in the frequency domain, may desirably (for coding efficiency) result in concentration of significant or non-zero coefficients within a region (or a plurality of distinct regions) within the 2D matrix of transform coefficient block 40. The concentration of coefficients into a specific area, such as within the upper left-hand corner of the 2D matrix may help to facilitate compression in the subsequent entropy coding process. Quantization of the transform coefficients within block 40 may further facilitate compression, and possibly improve concentration of the significant or non-zero coefficients in a specific area.

Figure 3:
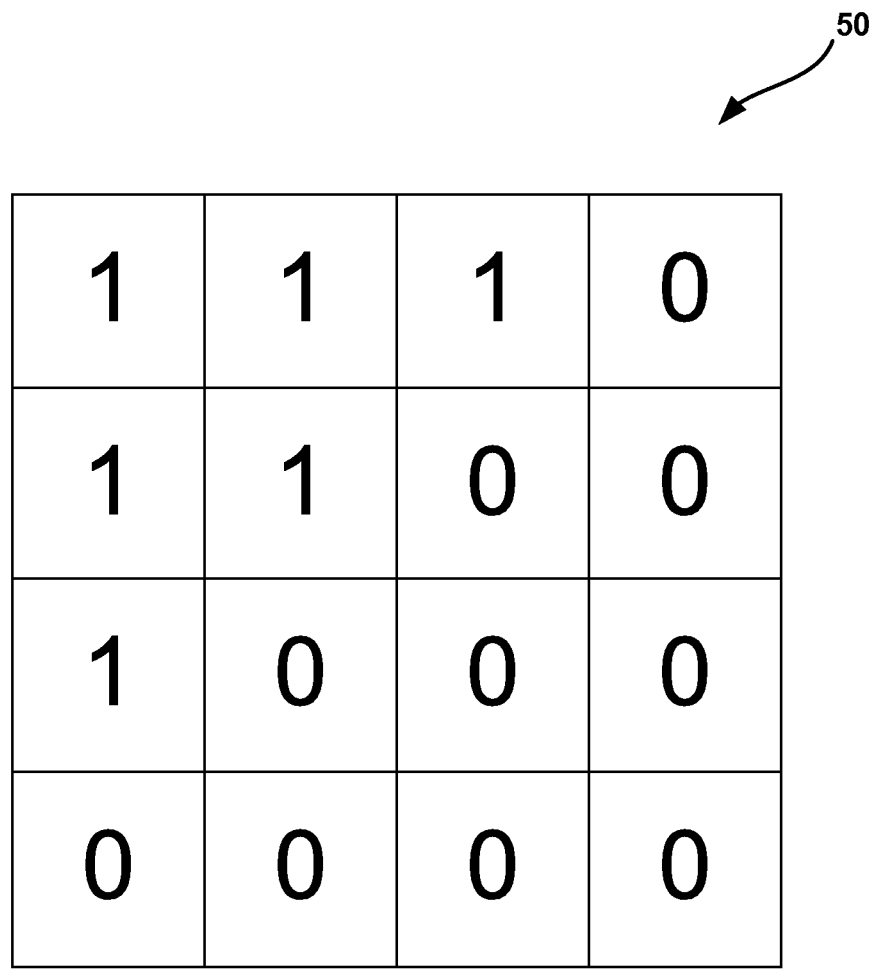
FIG. 3 is a conceptual diagram illustrating locations of significant transform coefficients within a block.

FIG. 3 is a conceptual diagram illustrating locations of significant transform coefficients from transform coefficient block 40 within a block 50. In particular, in block 50 of FIG. 3, significant transform coefficients from block 40 are represented with the number "1," and non-significant transform coefficients are represented with the number "0." Significant transform coefficients may be non-zero transform coefficients, e.g., before or after quantization. In other examples, non-significant transform coefficients are not necessarily zero, and the demarcation between significant and non-significant coefficients may be based on comparison of the coefficient value, e.g., before or after quantization, to a non-zero threshold.

When video encoder 20 performs an entropy encoding operation on a transform coefficient block, e.g., transform coefficient block 40, video encoder 20 may determine whether there is at least one significant (e.g., non-zero) transform coefficient in the transform coefficient block. If there is at least one significant transform coefficient in the transform coefficient block, video encoder 20 may update a coded block flag (CBF) to indicate that the transform coefficient block includes at least one significant transform coefficient. If there are no significant transform coefficients in the transform coefficient block, video encoder 20 may update the CBF to indicate that the transform coefficient block does not include any significant transform coefficients.

If there is at least one significant transform coefficient in the transform coefficient block, video encoder 20 may identify a last significant coefficient (LSC) of the transform coefficient block. The LSC of the transform coefficient block is the significant transform coefficient that occurs last when the transform coefficients of the transform coefficient block are sequenced according to a coding scanning order. Accordingly, which significant coefficient within a transform coefficient block is the LSC will depend of the scanning order for coding the transform coefficient block.

Video encoder 20 may identify the LSC of the transform coefficient block according to a particular one of various possible coding scanning orders. For example, video encoder 20 may identify the LSC according to a zigzag scanning order, a horizontal scanning order, a vertical scanning order, a diagonal scanning order, or a sub-block scanning order. Forward scanning orders start at a DC transform coefficient of a transform coefficient block. The DC transform coefficient occurs at a top left corner of the transform coefficient block. Reverse or inverse scanning orders may start at a bottom right corner of a transform coefficient block. The actual scan order that is used for any given situation may depend on one or more context factors, such as the coding mode that was used for the block.

In some examples, if the transform coefficient block is associated with an intra-predicted CU, video encoder 20 may select the scanning order based on an intra-prediction mode associated with the CU. Furthermore, in some examples, video encoder 20 may adaptively switch between scanning orders to optimize coding efficiency and/or subjective picture quality.

Figure 4:
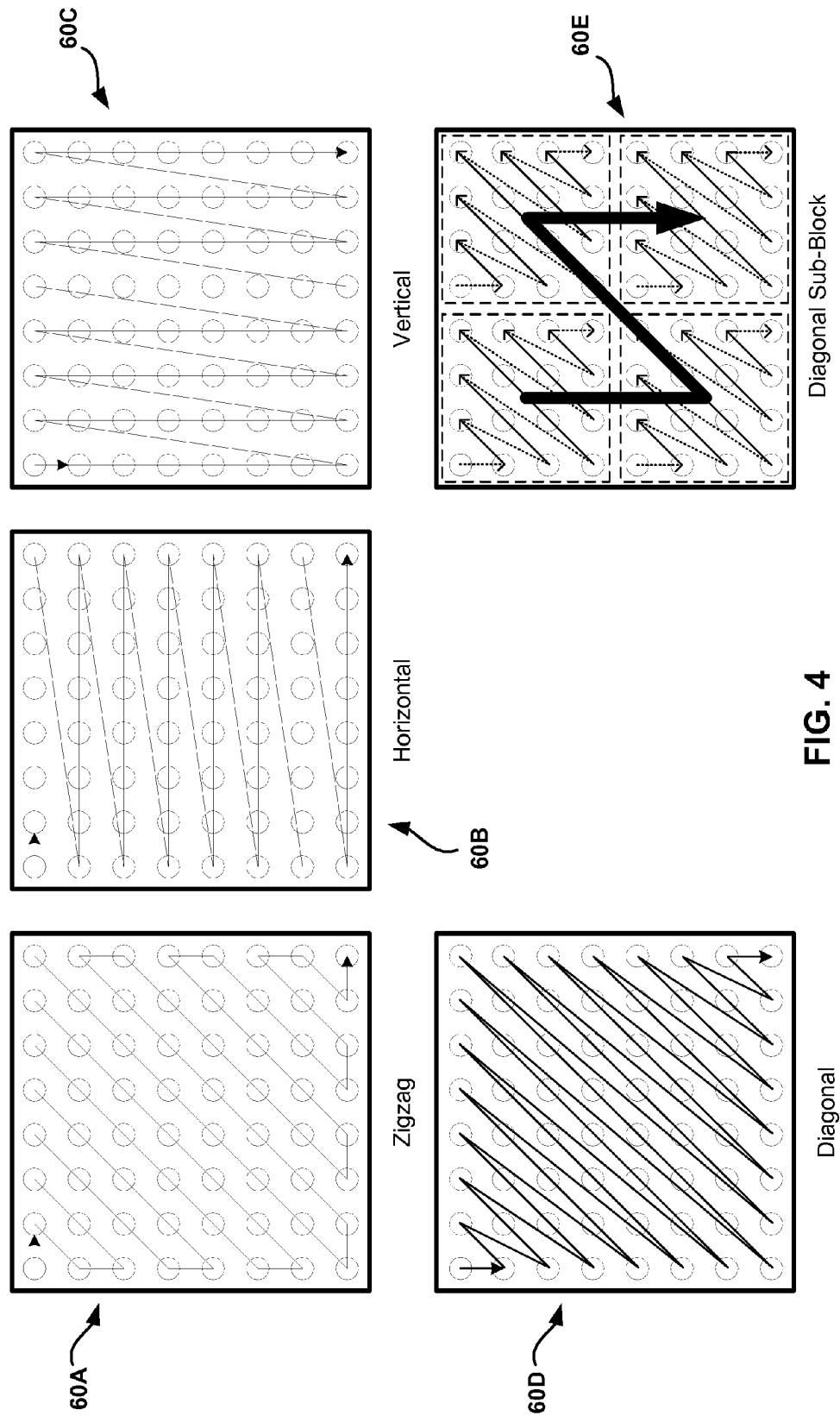
FIG. 4 is a conceptual diagram illustrating a plurality of example scan orders that may be used to scan blocks of transform coefficients.

FIG. 4 is a conceptual diagram illustrating a plurality of example scan orders that may be used to scan blocks of transform coefficients. In particular, FIG. 4 illustrates a plurality of example transform coefficient blocks 60A-60E (collectively, "transform coefficient blocks 60"), with transform coefficient positions within the blocks represented by circles. Each of transform coefficient blocks 60A-60E is associated with a respective scanning order represented by the path of one or more arrowed lines through the coefficient positions.

For example, block 60A is associated with an example zigzag scanning order. Block 60B is associated with an example horizontal scanning order. Block 60C is associated with an example a vertical scanning order. Block 60D is associated with an example diagonal scanning order.

Block 60E of FIG. 4 is associated with an example diagonal sub-block scanning order. In a sub-block scanning order, video encoder 20 may split a large transform coefficient block into sub-blocks. Video encoder 20 may then process each of the transform coefficients within a first sub-block before processing each of the transform coefficients in a second sub-block, and so on. In the example of FIG. 4, video encoder 20 has partitioned the 8×8 transform coefficient block into four 4×4 sub-blocks. In other examples, video encoder 20 may partition a transform coefficient block having the same or another size into sub-blocks having the same or other sizes. In FIG. 4, the sub-blocks are shown as dashed-line squares.

Figure 5:
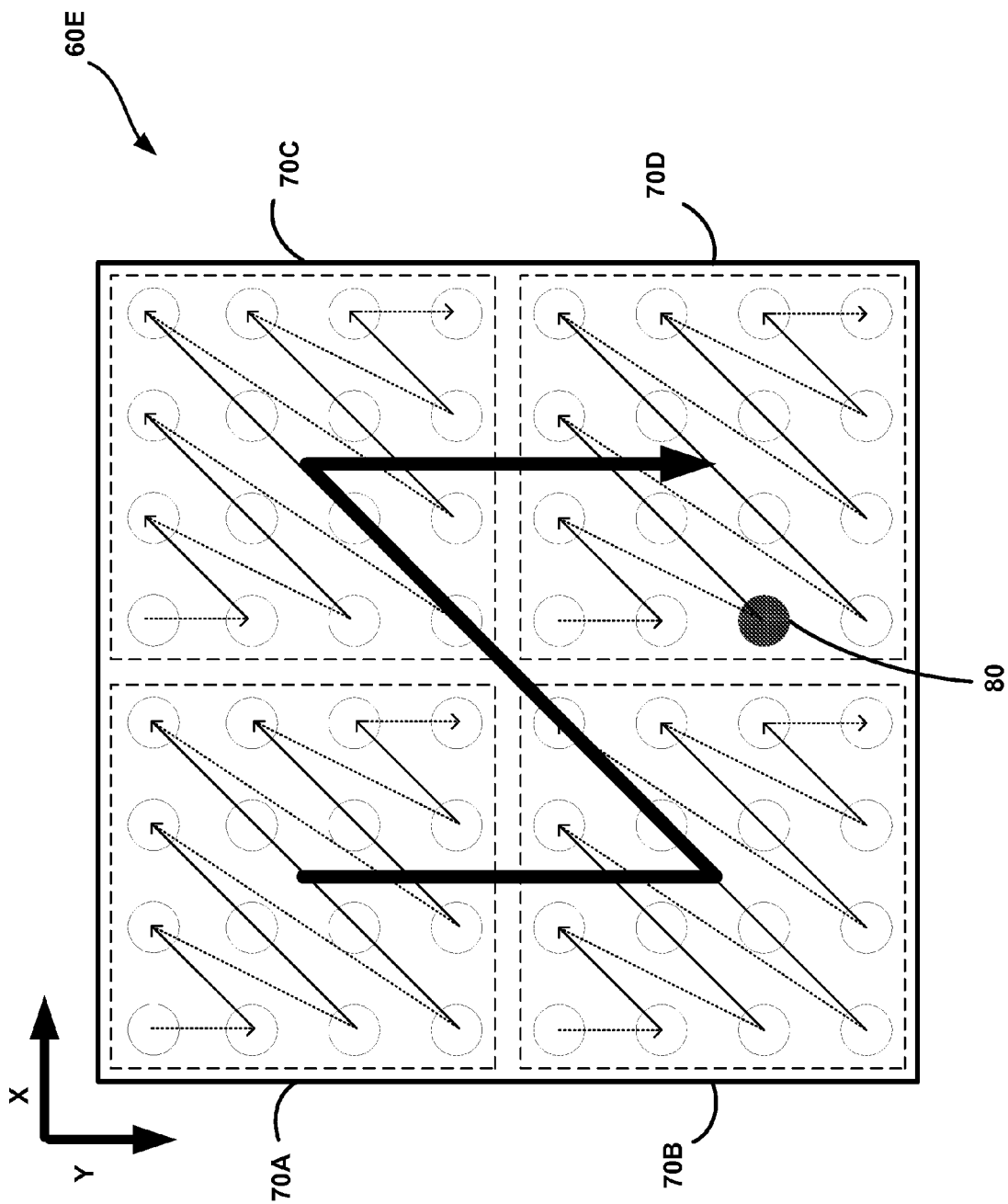
FIG. 5 is a conceptual diagram illustrating an example block of transform coefficients, the block including a plurality of sub-blocks.

FIG. 5 is a conceptual diagram further illustrating example transform coefficient block 60E that includes a plurality of sub-blocks 70A-70D (collectively, "sub-blocks 70"). When a transform coefficient block, such as transform coefficient block 60E, is divided into a plurality of sub-blocks, such as sub-blocks 70, the scanning order for coding the transform coefficient block may include both a sub-block scanning order for scanning the sub-blocks, and a coefficient scanning order for scanning the coefficients within each sub-block.

With reference to the example of transform coefficient block 60E, the sub-block scanning order is a diagonal scanning order. In particular, a video coder scans the coefficients of sub-block 70A, then the coefficients of sub-block 70B, then the coefficients of sub-block 70C, and then the coefficients of sub-block 70D. Additionally, within each of sub-blocks 70, the coding scanning order is also a diagonal scanning order. The sub-block and coefficient scanning orders illustrated in FIG. 5 are merely an example. In other examples, the sub-block and/or coefficient scanning orders may be other than diagonal scanning orders, the sub-block and coefficient scanning orders may be different, and/or the coefficient scanning orders in different sub-blocks may be different. Also, in some examples the scanning order for sub-blocks may be a forward scan, and the scanning order within each of the sub-blocks may be a reverse scan.

As described herein, video encoder 20 identifies an LSC for a transform coefficient block. The LSC is the last significant coefficient scanned according to the scanning order for the block. In the example of FIG. 5, filled circle 80 represents the position of the LSC within transform coefficient block 60E according to the sub-block diagonal scanning order for transform coefficient block 60E. However, if transform coefficient block 60E were associated with a different coding scanning order, a different coefficient position may be the LSC for the block.

In some examples, e.g., consistent with the H.264 standard, after identifying the LSC, video encoder 20 may determine an ordinal position of the LSC. The ordinal position of the LSC, also referred to as the index of the LSC according to the coding scanning order, may indicate a position of the LSC in a 1D vector that results from sequencing the significant and non-significant transform coefficients of the transform coefficient block according to the coding scanning order. For instance, video encoder 20 may determine that the LSC occurs at the n'th position in a 1D vector that results from sequencing the transform coefficients of the transform coefficient block according to the coding scanning order. In other words, if the transform coefficients of the transform coefficient block were sequenced according to the coding scanning order, video decoder 20 may determine that the LSC is the n'th transform coefficient. In such examples, n may be an integer, such as 5 or 10. In the example of FIG. 5, LSC 80 is the 52$^{nd}$ coefficient within transform coefficient block 60E according to the sub-block diagonal scanning order of block 60E. Accordingly, the index of LSC 80 may be 52.

In some examples, video encoder 20 may convert the index or ordinal position of the LSC according to the scan order into an x- and y-coordinate position, which is independent of any scan order (although the LSC is identified based on scan order, as described herein). In some examples, the DC transform coefficient, e.g., upper-most and left-most coefficient, may be the origin (0, 0) of the x- and y-coordinate system for the transform coefficient block. In the example of FIG. 5, the x- and y-coordinates for LSC 80 would be (5, 7). In some examples, e.g., consistent with the HEVC standard, video encoder need not determine ordinal position or index of the LSC to determine the coordinate position of the LSC. In either case a video encoder operating according to these existing standards may then signal the x- and y-coordinates for the LSC in the bitstream to indicate the LSC to video decoder 30. For example, in transform coefficient block encoding consistent with the HEVC standard, for a particular transform coefficient block, a video encoder encodes values of two syntax elements, namely "Last_X" and "Last_Y," to indicate a coordinate location of the LSC within the transform coefficient block.

According to these existing video coding standards, a video encoder may perform a CABAC or other context adaptive entropy encoding operation on the syntax element(s) for the x- and y-coordinates of the LSC within the transform coefficient block. In some instances, performing the context adaptive entropy encoding operation on the coordinates may be more efficient than performing the context adaptive entropy encoding operation on a corresponding scan-based ordinal position or index, because the entropy encoding operation may be able to exploit statistical relationships between the x-coordinate and the y-coordinate of the LSC among transform coefficient blocks. The video encoder may add the CABAC encoded version of the coordinate indicator to the encoded bitstream.

In addition, the video encoder may generate a significance map and level information for the transform coefficient block. The significance map may indicate which ones of the transform coefficients in the transform coefficient block are significant. Block 50 of FIG. 3 may be considered a 2D representation of an example significance map for transform coefficient block 40 of FIG. 2. The level information for the transform coefficient block may indicate the magnitudes and positive/negative signs of significant transform coefficients in the transform coefficient block.

To generate the level information, a video encoder may sequence the magnitudes (i.e., absolute values) of the significant transform coefficients and the positive/negative signs of the significant transform coefficients according to a reverse of the scanning order used to identify the LSC. The video encoder may perform entropy encoding operations on the LSC coordinate position indictor, e.g., Last_X and Last_Y, the significance map, and the level information. The video encoder may include the entropy encoded versions of the LSC coordinate position indictor, the significance map, and the level information in the bitstream. In this way, the video encoder may output entropy encoded versions of the LSC coordinate position indictor, the significance map, and the level information of the transform coefficient block.

A video encoder, such as video encoder 20, may perform one or more coding passes on the transform coefficient block to generate and entropy encode the significance map and the level information of the transform coefficient block. In each of the coding passes, video encoder 20 may scan through the transform coefficients of the transform coefficient block according to a reverse scanning order, e.g., beginning at the location of the LSC. The reverse scanning order may be a reverse of the scanning order used to identify the LSC. For example, if video encoder 20 identified the LSC according to a forward diagonal scanning order, the reverse scanning order may be a reverse diagonal scanning order.

For each transform coefficient processed during a first coding pass, video encoder 20 may determine whether the ordinal position of the transform coefficient occurs before the ordinal position of the LSC. If the ordinal position of the transform coefficient occurs before the ordinal position of the LSC, video encoder 20 may generate and context adaptive entropy, e.g., CABAC, encode a syntax element (i.e., a significance flag) that indicates whether the transform coefficient is significant. If the transform coefficient does not occur before the ordinal position of the LSC, video encoder 20 does not generate or context adaptive entropy encode a significance flag for the transform coefficient. In this way, video encoder 20 may generate and context adaptive entropy encode a significance map for the transform coefficient block. After generating and context adaptive entropy encoding the significance map, video encoder 20 may include the context adaptive entropy encoded version of the significance map in the bitstream.

In some instances, there may be statistical relationships between the position of the LSC and the content of the significance map. Accordingly, video encoder 20 may use the position of the LSC to select one or more context models for use in context adaptive entropy encoding the significance flags of the significance map.

For each transform coefficient processed during a second coding pass according to the reverse scanning order, video encoder 20 may determine whether the transform coefficient is significant. If the transform coefficient is significant, video encoder 20 may generate and context adaptive entropy encode a syntax element (e.g., a level-greater-than-one flag) that indicates whether the absolute value of the transform coefficient is greater than one. If the transform coefficient is not significant, video encoder 20 does not generate or context adaptive entropy encode a level-greater-than-one flag for the transform coefficient. After generating and context adaptive entropy encoding the level-greater-than-one flags, video encoder 20 may include the context adaptive entropy encoded versions of the level-greater-than-one flags in the bitstream.

For each transform coefficient processed during a third coding pass according to the reverse scanning order, video encoder 20 may, in the reverse scanning order, identify transform coefficients whose absolute value was greater than one in the second coding pass, determine whether the absolute values of these transform coefficients are greater than two, and generate and context adaptive entropy encode syntax elements indicating whether the absolute values of the transform coefficients are greater than two (i.e., level-greater-than-two flags). After generating and context adaptive entropy encoding the level-greater-than-two flags, video encoder 20 may include the context adaptive entropy encoded versions of the level-greater-than-two flags in the bitstream.

For each transform coefficient processed during a fourth coding pass according to the reverse scanning order, video encoder 20 may determine whether the absolute value of the transform coefficient was greater than two. For such transform coefficients, video encoder 20 may generate a remainder value for the coefficient (i.e., level-remainder elements), indicating the remainder value greater than two. Video encoder 20 may then encode, e.g., context adaptive entropy encode, the level remainder elements.

For each transform coefficient processed during a fifth coding pass according to the reverse scanning order, video encoder 20 may determine whether the transform coefficient values were positive or negative. For such transform coefficients, video encoder 20 may generate a syntax element (i.e., a sign flag) that indicates whether the transform coefficient is positive or negative. If the transform coefficient is not significant, video encoder 20 does not generate a sign flag for the transform coefficient. After generating the sign flags, video encoder 20 may include the sign flags in the bitstream.

When video decoder 30 receives a bitstream, video decoder 30 may perform a parsing operation on the bitstream. The parsing operation extracts syntax elements from the bitstream. Video decoder 30 may perform a reconstruction operation that reconstructs video blocks of the video data based on the syntax elements extracted from the bitstream. In some instances, video decoder 30 may perform the parsing operation and the reconstruction operation in parallel.

As part of performing the parsing operation, video decoder 30 may perform entropy decoding operations on various entropy encoded syntax elements in the bitstream. For example, video decoder 30 may perform entropy decoding operations on entropy encoded LSC position coordinate indicators, e.g., Last_X and Last_Y, significance maps, level information for transform coefficient blocks, and other syntax elements in the bitstream. The other syntax elements may include intra-mode parameters, motion information, and so on. The intra-mode parameters indicate intra-prediction modes.

The above-described techniques relating to coefficient coding have several drawbacks. As one example, coding x- and y-coordinates for an LSC, such as values of syntax elements "Last_X" and "Last_Y" according to the HEVC standard, may, in some cases, require a significant amount of information. For example, in cases where the transform coefficient block is relatively large, e.g., 64×64, and where the location of the last significant coefficient within the block occurs relatively later in the scanning order or otherwise relatively far from the origin of the x- and y-coordinate system, the x- and y-coordinate values for the LSC may be relatively large. In such examples, values of Last_X and Last_Y may necessarily be represented using a large amount of data (e.g., a large number of bits). For example, in a 64×64 block of transform coefficients, the last position may be (30, 50), which would require a relatively large number of bits to code.

This disclosure describes several techniques that may, in some cases, reduce or eliminate some of the drawbacks described above with reference to coding transform coefficients of blocks of video data, e.g., according to the HEVC standard. For example, the techniques of this disclosure may improve data compression of information used to indicate a position of the LSC, according to a scanning order associated with a block of transform coefficients for a block of video data, within the block. The techniques of this disclosure may, in some cases, reduce the amount of data (e.g., the number of bits) used to represent this information in the coded bitstream.

For example, this disclosure describes so-called "two-level" approaches to coding LSC position information for a block that includes a plurality of sub-blocks. In some examples, a video coder, e.g., video encoder 20 or video decoder 30, codes, e.g., encodes or decodes, information indicating the location within the block of a particular one of the plurality of sub-blocks that includes the LSC. This particular sub-block may be referred to as a "last significant sub-block" for the block. Coding information to identify the location of the last significant sub-block within the block may be first level of a two-level approach according to this disclosure.

In such examples, a video coder may additionally code information that indicates a location of the LSC within the last significant sub-block. Coding information to identify the location of the LSC within the last significant sub-block may be second level of a two-level approach according to this disclosure. Two-level coding of the location of the last significant sub-block within the block and the location of the LSC within the last significant sub-block may require less bits in the bitstream than signaling the location of the LSC within the entire block, e.g., according to the proposals for the HEVC standard. This reduction of bitrate may be particularly evident for relatively large blocks and/or in situations in which the LSC is located further from the coordinate origin, e.g., the upper left corner, of the block, and/or or later in the scanning order associated with the block.

In some examples, a video coder codes x- and y-coordinate positions for one or both of the sub-block position and the coefficient position. The x- and y-coordinate positions of the last significant sub-block may be represented by syntax elements, e.g., Last_subblock_X and Last_subblock_Y. By decoding the x- and y-coordinate sub-block position values, e.g., Last_subblock_X and Last_subblock_Y, video decoder 30 may determine the x- and y-coordinate location of the particular sub-block of the plurality of sub-blocks of the block that contains the LSC for the block.

For example, assuming that the LSC position information for a 64×64 coefficient block of video data is indicated using x- and y-coordinates (x, y)=(30, 50), video encoder 20 may determine the value of Last_subblock_X using the expression 30/4=7, and the value of Last_subblock_Y using the expression 50/4=12 (as shown, the result of each expression is rounded down). In this example, the 64×64 transform coefficient block is divided into a 16×16 array of 4×4 transform coefficient sub-blocks. Accordingly, based on the size of the sub-blocks (M×M), in this example (4×4), the denominator used in the expressions to determine the values of Last_subblock_X and Last_subblock_Y is 4. The sub-block x- and y-coordinate system for values of Last_subblock_X and Last_subblock_Y ranges from (0, 0) to (N−1, N−1), wherein (N×N) is the size of the array of (M×M) sub-blocks. In the example of the 64×64 transform coefficient block divided into a 16×16 array of 4×4 transform coefficient sub-blocks, N is equal to 16. More generally, Last_subblock_X and Last_subblock_Y may be determined according to the following equations for M×M sub-blocks:

$$\text{Last\_subblock}\_X = \text{Last}\_X/M \quad (1)$$

$$\text{Last\_subblock}\_Y = \text{Last}\_Y/M \quad (2)$$

In addition to encoding the x- and y-coordinate sub-block position values, video encoder 20 may encode x- and y-coordinate position values for the coefficient position. The x- and y-coordinate position values for the coefficient position indicate the coordinate position of the LSC within the sub-block identified by the x- and y-coordinate sub-block position values. The x- and y-coordinate position values for the coefficient position may be represented by respective syntax elements, e.g., "last_rem_X" and "last_rem_Y." By decoding the x- and y-coordinate position values for the coefficient position, e.g., last_rem_X and last_rem_Y, video decoder 30 may determine the x- and y-coordinate location of the LSC within the particular sub-block of the plurality of sub-blocks of the block that contains the LSC, e.g., as indicated by the decoded values of Last_subblock_X and Last_subblock_Y.

In the above-described example of a 64×64 transform coefficient block divided into a 16×16 array of 4×4 transform coefficient sub-blocks, where the LSC position information for the block is indicated using x- and y-coordinates (x, y)=(30, 50), the value of last_rem_X can be determined using the expression 30−4×7=2, and the value of last_rem_Y can be determined using the expression 50−4×12=2. More generally, last_rem_X and last_rem_Y may be determined according to the following equations for M×M sub-blocks:

$$\text{last\_rem}\_X = \text{Last}\_X - (M \times \text{Last\_subblock}\_X) \quad (3)$$

$$\text{last\_rem}\_Y = \text{Last}\_Y - (M \times \text{Last\_subblock}\_Y) \quad (4)$$

In this manner, the two-level LSC position coding techniques of this disclosure may include coding x- and y-coordinates for one or both the sub-block position and the coefficient position. In some examples, the two-level LSC position coding techniques of this disclosure may include coding one or both of two sets of values of syntax elements, namely values of Last_subblock_X and Last_subblock_Y, and values of last_rem_X and last_rem_Y.

As another example, alternatively, the last significant coefficient position information for the block can be signaled using one or more indices. For instance, the last significant coefficient position information can be signaled using an index of the position of the last significant coefficient within the scanning order. For example, for a block of N×N coefficients, the position at location (0, 0) within the block may have an index of "0," and the position at location (N−1, N−1) within the block may have an index of "N×N−1."

Additionally, in this example, the previously described two-level signaling technique can also be applied. Specifically, the block may be associated with a particular block-level scanning order according to which the sub-blocks of the block are coded. Furthermore, each sub-block of the block may be associated with a particular sub-block-level scanning index according to which coefficients of the respective sub-block are coded. As such, each coefficient of a particular sub-block may be associated with a scanning index within the corresponding sub-block-level scanning order, which may range from a value of "0" to a value of "S−1," where "S" is the total number of coefficients within the sub-block. For example, using the two-level signaling technique described above, an encoder may first signal an indication of the scanning order associated with the sub-block that includes the last significant coefficient for the block, and subsequently signal the index of the last significant coefficient within the sub-block. Additionally, in some examples, the encoder may also signal an indication of the sub-block itself.

In some examples, a video coder, e.g., video encoder 20 and/or video decoder 30, codes, e.g., encodes or decodes, an index or ordinal position according to the scanning order for the block for one or both of the sub-block position and the coefficient position for the LSC of the block. As discussed above with reference to FIG. 5, the scanning order for a transform coefficient block including sub-blocks includes a sub-block scanning order for the sub-blocks within the block, and a coefficient scanning order for the coefficients within the sub-blocks. Each sub-block may be associated with a sub-block index value within the sub-block scanning order, e.g., 0, 1, 2, . . . , or J−1, for a transform coefficient block divided into J sub-blocks. Similarly, inside each sub-block having K coefficients, each coefficient may be associated with a coefficient index value within the coefficient scanning order, e.g., 0, 1, 2, . . . , or K−1.

In such examples of two-level LSC position information coding, video encoder 20 may determine and encode into the bitstream one or both of the sub-block index value and the coefficient index value, e.g., syntax elements representing these values, to indicate the position of the LSC within a transform coefficient block. Video decoder 30 may decode from the bitstream one or both of the sub-block index value or the coefficient index value for a block of transform coefficients. Video coder 30 may determine the LSC for the block of transform coefficients based on the scan indices.

As yet another example, video encoder 20 may determine the LSC position information for the block using other techniques, e.g., scanning order based techniques that are similar to those used in H.264. As described above, in HEVC, LSC position information for a transform coefficient block is represented using row and column indices (i.e., x- and y-coordinates) within the block (e.g., Last_X and Last_Y), irrespective of a scanning order associated with the block (i.e., the scanning order used to code the remaining SM data for the block). In contrast to this HEVC approach, in some examples, the techniques of this disclosure may include coding last significant coefficient position information for a block of video data using knowledge of the scanning order associated with the block.

For example, initially, video encoder 20 may use the scanning order to determine the ordinal position or index of the LSC within a one-dimensional (1-D) array of coefficients of the block defined by the scanning order (e.g., in a similar manner as performed in SM coding according to H.264). Subsequently, this so-called "1-D" position may be converted into a column index and a row index (i.e., x- and y-coordinates, such as Last_X and Last_Y). As one example, syntax element "last_1D" may denote the ordinal position or index of the LSC within the 1-D array of all coefficients of the transform coefficient block according to the scanning order of the entire transform coefficient block. Additionally, syntax elements "block_size_x" and "block_size_y" may denote the size of the block in the row and column directions, respectively. In this example, the value of last_1D can be converted into values of syntax elements "last_x" and "last_y," which may denote the position of the last significant coefficient within the 2-D block of coefficients (e.g., as an x- and y-coordinate pair "last_x, last_y") using the following equations:

$$\text{last\_y} = \frac{\text{last\_1D}}{\text{block\_size\_x}} \text{ and last\_x} = \text{last\_1D\% block\_size\_x} \quad (5)$$

Once video encoder 20 has determined the values of last_x and last_y, video encoder 20 may employ any of the two-level encoding techniques described herein, e.g., with respect to Last_X and Last_Y, to encode the LSC position information. Video decoder 30 may decode the encoded LSC position information as described herein to derive values of last_x and last_y. Video decoder 30 may then determine last_1D using equations (5).

In some examples, in addition to identifying position of the LSC for the transform coefficient block as a whole using the techniques described herein, a video coder may identify positions of last significant coefficients in each of a plurality of sub-blocks within the block. There may be one LSC for the block as a whole, e.g., global LSC, according to the scanning order for the transform coefficient block. However, each sub-block may include a last significant coefficient for the sub-block according to the coefficient scanning order for the sub-block. A video coder may, for each of a plurality of sub-blocks of the block, code information, e.g., local information, indicating the position of the last significant coefficient of the sub-block within the sub-block. For example, the video coder may, for each of a plurality of sub-blocks of a block of transform coefficients, code values of last_rem_X and last_rem_Y indicating the x- and y-coordinate position of a last significant coefficient within the sub-block. In other examples, rather than coordinate position information, a video coder may code ordinal positions or index values for each of the plurality of sub-blocks according to the coefficient scanning order for the sub-blocks. The ordinal positions or index values may indicate the position of the last significant coefficients within the respective sub-blocks.

In some examples, the type of coding used by a video coder to code the LSC position information may be based on the values of the LSC position information. In some examples, video encoder 20 compares the sub-block position (first level information) to a threshold. In such examples, if the sub-block position is less than the threshold, video encoder 20 may encode the coefficient position (second level information) using a unary or truncated unary codeword. If the sub-block position is greater than or equal to the threshold, video encoder 20 may encode the coefficient position using a fixed length codeword.

Similarly, the entropy coding of the LSC position information may be based on the values of the LSC position information. In general, video encoder 20 may binarize each of the sub-block and coefficient position information into respective sequences of one or more bins. Video encoder 20 may then encode each of the one or more bins associated with the sub-block position and coefficient position by performing a context adaptive entropy encoding process. The context adaptive entropy encoding process may be CABAC, or may be another context adaptive entropy encoding process, such as CAVLC. The context adaptive entropy encoding process may include, for at least one of the bins, encoding the bin using a regular encoding mode that includes determining a context for the bin using a context model, and encoding the bin using the determined context. The context adaptive entropy encoding process may include, for at least one of the bins, encoding the bin using a bypass coding mode that does not include determining a context to encode the bin.

In some examples, video encoder 20 compares the sub-block position (first level information) to a threshold. In such examples, if the sub-block position is less than the threshold, video encoder 20 may encode the coefficient position (second level information) using the regular encoding mode, e.g., based on a determined context for the bin. If the sub-block position is greater than or equal to the threshold, video encoder 20 may encode the coefficient position using at least one of the regular encoding mode or the bypass encoding mode.

In general, video encoder 20 may encode some bins of the LSC position information using the regular encoding mode, and others using the bypass encoding mode. For example, video encoder 20 may encode one or more bins of each or any of Last_subblock_X, Last_subblock_Y, last_rem_X and last_rem_Y using the regular encoding mode, and one or more bins of each or any of Last_subblock_X, Last_subblock_Y, last_rem_X and last_rem_Y using the bypass encoding mode.

In some examples, one or more bins of the sub-block position may correspond to, e.g., according to an ordering of bins, one or more bins of the coefficient position. In such examples, one or more pairs of corresponding bins of the sub-block and coefficient position may share a context of context adaptive entropy encoding using the regular encoding mode. For example, corresponding bins from Last_subblock_X and last_rem_X may share a context, and corresponding bins from Last_subblock_Y and last_rem_Y may share a context.

In some examples, one or more bins of the x-coordinate of the sub-block position may correspond to one more bins of the y-coordinate of the sub-block position. For example, one or more bins of Last_subblock_X may correspond to one or more bins of Last_subblock_Y. Similarly, one or more bins of the x-coordinate of the coefficient position may correspond to one more bins of the y-coordinate of the coefficient position. For example, one or more bins of last_rem_X may correspond to one or more bins of last_rem_Y.

In such examples, one or more pairs of corresponding bins for the x- and y-coordinates may share a context for context adaptive entropy encoding according to the regular encoding mode. In some examples, the corresponding bins for the x- and y-coordinates may partially share contexts. For example, some pairs of corresponding bins, e.g., the first one or more, may have separate contexts, while the other pairs of corresponding bins share contexts.

In some examples, video encoder 20 may encode bins from the x dimension and y dimension in an interleaving manner. For example, video encoder 20 may first encode all bins in the x dimension, e.g., from Last_subblock_X and last_rem_X, that are arithmetic encoded using the regular encoding mode using a context. Video encoder 20 may then encode all bins in the y dimension, e.g., from Last_subblock_Y and last_rem_Y, that are arithmetic encoded using the regular encoding mode using a context. Video encoder 20 may then encode all bins in the x dimension that are bypass encoded, and then encode all bins in the y dimension that are bypass encoded.

Additionally, in some examples, a video coder may employ the techniques described in commonly-assigned U.S. application Ser. No. 13/303,015, filed Oct. 22, 2011 to code x- and y-coordinate values for one or both of the sub-block and coefficient position based on the coding scanning order used to determine the LSC position. For example, a video coder may code such x- and y-coordinates in a first manner when the scanning order comprises a first scanning order, and code such coordinates in a second manner when the scanning order comprises a second scanning order. The first and the second scanning orders may be symmetrical with respect to one another (or at least partially symmetrical), e.g., horizontal and vertical scanning orders. Because of the symmetry among the first and second scanning orders, the probability of the x-coordinate comprising a given value when the scanning order comprises the first scanning order may be the same as, or similar to the probability of the y-coordinate comprising the same value when the scanning order comprises the second scanning order, and vice versa. Similarly, the probability of the y-coordinate comprising a given value when the scanning order comprises the first scanning order may be the same as, or similar to the probability of the x-coordinate comprising the same value when the scanning order comprises the second scanning order, and vice versa. In other words, the x- and y-coordinates when the scanning order comprises the first scanning order may each have the same or similar probability of comprising a given value as the interchanged x- and y-coordinates, respectively, when the scanning order comprises the second scanning order. As such, the x- and y-coordinates and the interchanged x- and y-coordinates may be coded using common statistics for purposes of context adaptive entropy coding, which may result in using coding systems that have less complexity relative to other systems. Furthermore, the common statistics may be updated based on the x- and y-coordinates and the interchanged x- and y-coordinates, which may result in the statistics being more accurate than similar statistics updated using other techniques, and, thus, in coding the respective coordinates more efficiently. In some examples, context models used for the x- and y-coordinates may be swapped depending on the scanning order.

The examples techniques for encoding and entropy encoding discussed above with respect to video encoder 20 apply equally to decoding and entropy decoding the resulting bitstream by video decoder 30. Additionally, the techniques described in the examples above may be applicable to other block sizes and sub-block sizes. For example, techniques described herein may be applicable to any blocks or sub-blocks having side dimensions defined as powers of 2 (e.g., 4, 8, 16, 32, 64, and so forth).

As can be seen from the various examples described herein, video encoder 20 is an example of a video encoder configured to encode a block of transform coefficients associated with a block of video data during a video encoding process, wherein the block of transform coefficients includes a plurality of sub-blocks. Video encoder 20 is an example of a video encoder configured to encode information that identifies a position within the block of transform coefficients of one of the coefficients that is an LSC for the block according to a scanning order associated with the block of transform coefficients. Video encoder 20 is an example of video encoder configured to encode the information by encoding a sub-block position that identifies a position of one of the sub-blocks that includes the LSC within the block, and encoding a coefficient position that identifies a position of the LSC within the sub-block that includes the LSC. Video encoder 20 is an example of a video encoder configured to encode the block of transform coefficients based on the position of the LSC.

Additionally, video decoder 30 is an example of a video decoder configured to decode a block of transform coefficients associated with a block of video data during a video decoding process, wherein the block of transform coefficients includes a plurality of sub-blocks. Video decoder 30 is an example of a video decoder configured to decode information that identifies a position within the block of transform coefficients of one of the coefficients that is an LSC for the block according to a scanning order associated with the block of transform coefficients. Video decoder 30 is an example of video decoder configured to decode the information by decoding a sub-block position that identifies a position of one of the sub-blocks that includes the LSC within the block, and decoding a coefficient position that identifies a position of the LSC within the sub-block that includes the LSC. Video decoder 30 is an example of video decoder configured to decode the block of transform coefficients based on the position of the LSC.

Figure 6:
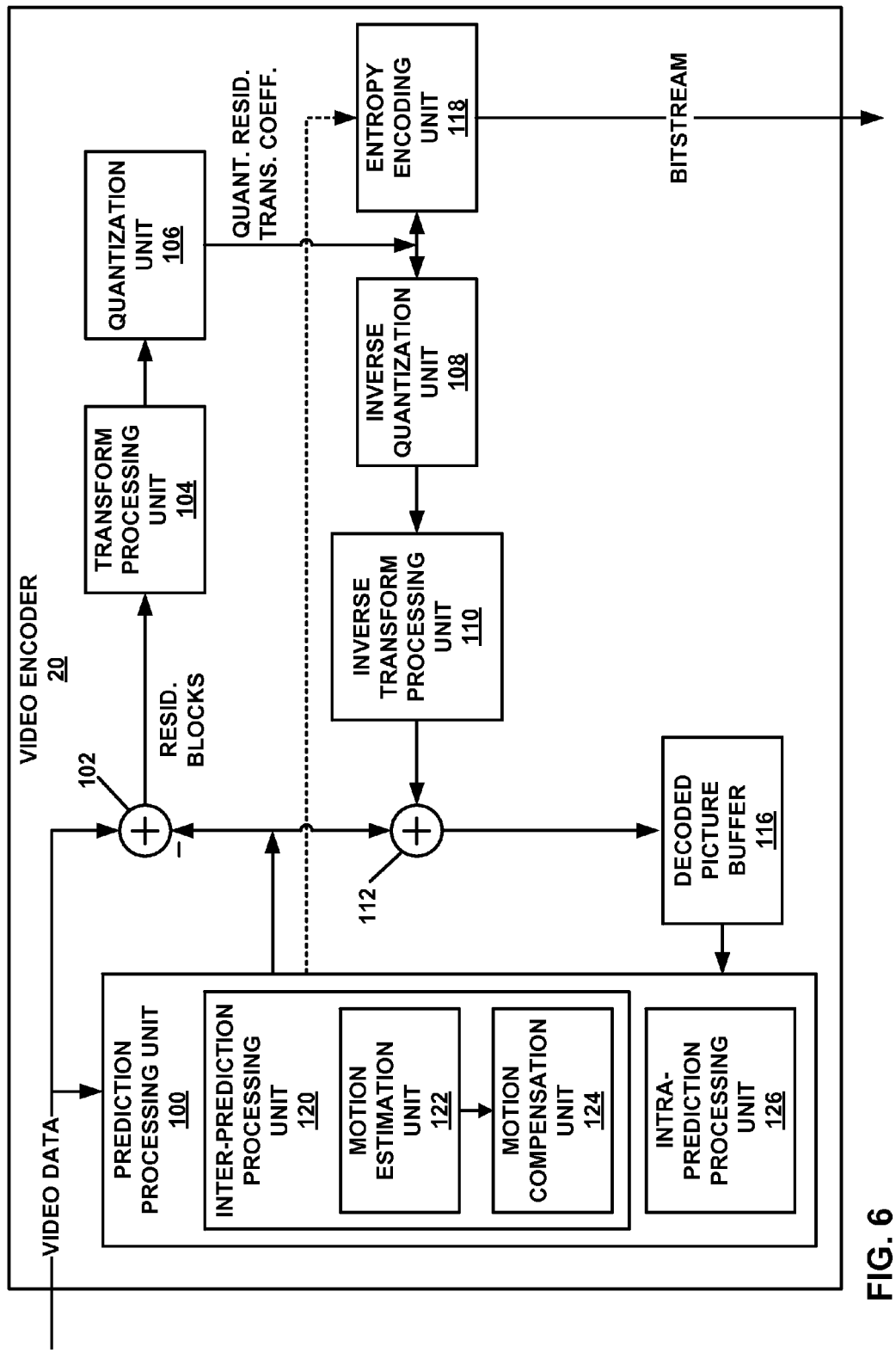
FIG. 6 is a block diagram illustrating an example video encoder that may implement the techniques of this disclosure.

FIG. 6 is a block diagram illustrating an example video encoder 20 that may be configured to implement the techniques of this disclosure. FIG. 6 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 6, video encoder 20 includes a prediction processing unit 100, a residual generation unit 102, a transform processing unit 104, a quantization unit 106, an inverse quantization unit 108, an inverse transform processing unit 110, a reconstruction unit 112, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the sample blocks of the PU. Motion estimation unit 122 may generate a reference index that indicates a position in RefPicList0 of the reference picture containing the reference region for the PU. In addition, motion estimation unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation unit 122 may output the reference index and the MV as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes that indicate positions in RefPicList0 and RefPicList1 of the reference pictures that contain the reference regions. In addition, motion estimation unit 122 may generate MVs that indicate spatial displacements between the reference location associated with the reference regions and a sample block of the PU. The motion information of the PU may include the reference indexes and the MVs of the PU. Motion compensation unit 124 may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Each of the transform coefficient blocks may be a 2D matrix of transform coefficients. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

A filter unit (not shown) may perform one or more deblocking operations to reduce blocking artifacts in the coding blocks associated with a CU. Decoded picture buffer 116 may store the reconstructed coding blocks after the filter unit performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive transform coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In accordance with one or more techniques of this disclosure, one or more units within video encoder 20 may perform one or more techniques described herein as part of a video encoding process. For example, entropy encoding unit 118 may receive a transform coefficient block from quantization unit 106. When entropy encoding unit 118 receives the transform coefficient block, entropy encoding unit may identify the position of the LSC in the transform coefficient block. Entropy encoding unit 118 may encode two levels of position information to encode the LSC position information using any of the techniques described herein, e.g., with respect to video encoder 20 or a video encoder generally. For example, entropy encoding unit 118 may encode a sub-block position of a sub-block within the block, e.g., Last_subblock_X and Last_subblock_Y, and a coefficient position of the LSC within the identified sub-block, e.g., last_rem_X and last_rem_Y. Entropy encoding unit may also context adaptive entropy encode the position information using any of the techniques described herein, e.g., with respect to video encoder 20 or a video encoder generally.

Figure 7:
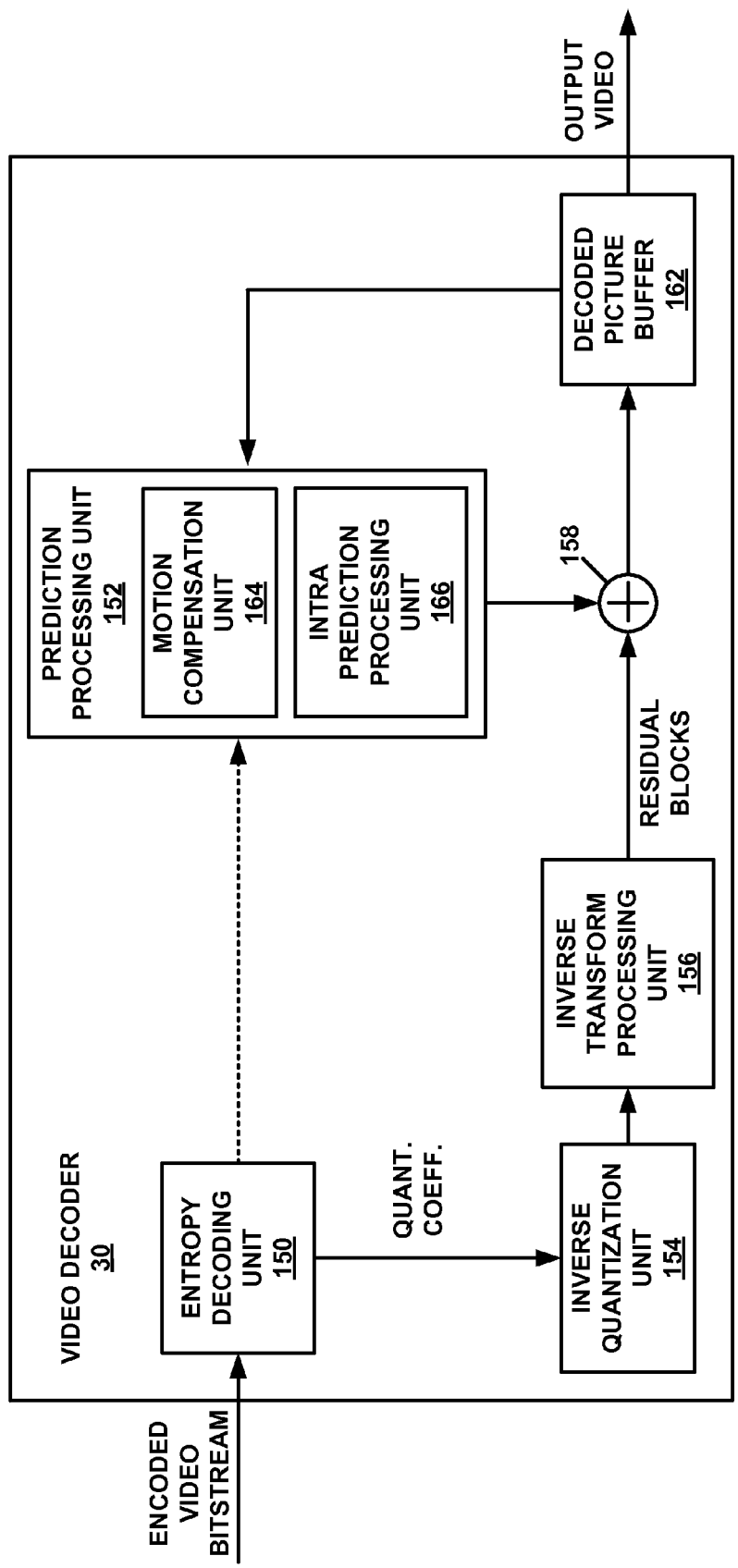
FIG. 7 is a block diagram illustrating an example video decoder that may implement the techniques of this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 7, video decoder 30 includes an entropy decoding unit 150, a prediction processing unit 152, an inverse quantization unit 154, an inverse transform processing unit 156, a reconstruction unit 158, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU. Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

A filter unit (not shown) may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply an inverse transform to the transform coefficient levels to generate a residue (or residual) block, generate, based at least in part on the residue block, a coding block, and output the coding block for display.

In accordance with one or more techniques of this disclosure, one or more units within video decoder 30 may perform one or more techniques described herein as part of a video decoding process. For example, entropy decoding unit 150 may decode two levels of position information to decode the LSC position information for a transform coefficient block using any of the techniques described herein, e.g., with respect to video decoder 30 or a video decoder generally. For example, entropy decoding unit 150 may decode a sub-block position of a sub-block within the block, e.g., Last_subblock_X and Last_subblock_Y, and a coefficient position of the LSC within the identified sub-block, e.g., last_rem_X and last_rem_Y. Entropy decoding unit 150 may also context adaptive entropy decode the position information using any of the techniques described herein.

Entropy decoding unit 150 may determine the coding scanning order. In various examples, entropy decoding unit 150 may determine the coding scanning order in different ways. For example, the coding scanning order may be signaled in the bitstream or may be inferred by entropy decoding unit 150 from one or more syntax elements or parameters. If the transform coefficient block is associated with an intra-predicted PU, the scanning order may be inferred from an intra-prediction mode for the intra-predicted PU. In some examples, entropy decoding unit 150 may determine the scanning order based on a size of the video block associated with the CU or a size of a transform coefficient block, a transform applied to generate the transform coefficient block, a partitioning mode of PUs of the CU, and/or based on other data.

Entropy decoding unit 150 may then entropy decode the significance map for the transform coefficient block. In some examples, entropy decoding unit 150 may entropy decode the significance map based on the position information of the LSC. For example, entropy decoding unit 150 may select a context model based on LSC position information. In this example, entropy decoding unit 150 may use the selected context model during a context adaptive entropy decoding operation, e.g., CABAC, that decodes the significance map. Entropy decoding unit 150 may also perform a context adaptive entropy decoding that decodes the level information of the transform coefficient block. In some examples, entropy decoding unit 150 may context adaptive entropy decode syntax elements in the level information using one or more context models selected based on the LSC position information.

After entropy decoding the significance map, entropy decoding unit 150 may reconstruct the significance map based on the location of the LSC within the transform coefficient block. For instance, the bitstream may not include significance flags that indicate the significance of transform coefficients occurring after the LSC in coding scanning order. Accordingly, entropy decoding unit 150 may reconstruct the significance map by synthesizing significance flags for transform coefficients having coordinates that occur after the coordinates of the LSC in coding scanning order.

After reconstructing the significance map and entropy decoding the level information, entropy decoding unit 150 may reconstruct the transform coefficient block based on the significance map and the level information. The bitstream may not include level information for transform coefficients occurring after the LSC in coding scanning order. Accordingly, entropy decoding unit 150 may synthesize zero-valued transform coefficients at coordinates that occur after the coordinates of the LSC in coding scanning order. In addition, entropy decoding unit 150 may synthesize zero-valued transform coefficients at positions indicated by the significance map as containing non-significant coefficients. Entropy decoding unit 150 may reconstruct the transform coefficient block by appropriately arranging the transform coefficients indicated by the level information and the synthesized transform coefficients. The transform coefficient block may generally match the transform coefficient block generated by quantization unit 106 of video encoder 20.

Figure 8:
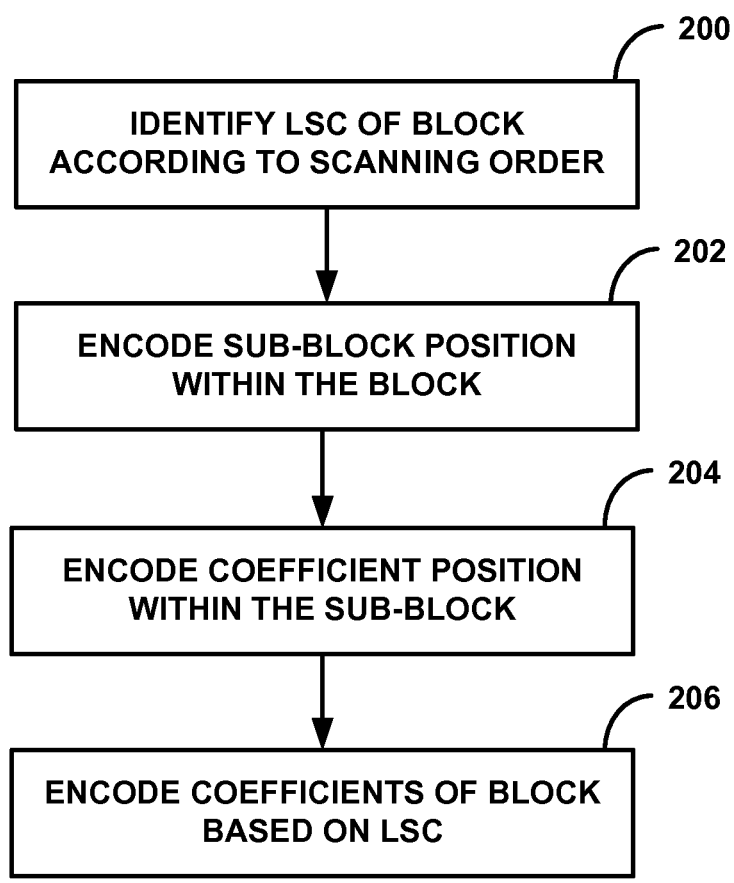
FIG. 8 is a flow diagram illustrating an example method for encoding a block of transform coefficients including two-level encoding of a position of a last significant coefficient (LSC) of the block.

FIG. 8 is a flow diagram illustrating an example method for encoding a block of transform coefficients including two-level encoding of a position of a last significant coefficient (LSC) of the block. According to the example method of FIG. 8, video encoder 20, e.g., entropy encoding unit 118 of the video encoder, identifies which significant coefficient in a transform coefficient block is the LSC according to a scanning order of the transform coefficient block (200). Video encoder 20 then encodes a sub-block position of the sub-block containing the LSC within transform coefficient block (202). For example, video encoder 20 may encode x- and y-coordinate values for the sub-block position, e.g., syntax elements Last_subblock_X and Last_subblock_Y. In other examples, video encoder 20 may encode an ordinal position or index of the sub-block according to the sub-block scanning order within the block of transform coefficients.

Video encoder 20 also encodes a coefficient position of the LSC within the identified sub-block (204). For example, video encoder 20 may encode x- and y-coordinate values for the coefficient position, e.g., syntax elements last_rem_X and last_rem_Y. In other examples, video encoder 20 may encode an ordinal position or index of the coefficient according to the coefficient scanning order within the sub-block including the LSC.

Video encoder 20 encodes the coefficients of the block of transform coefficients based on the LSC (206). For example, video encoder 20 may scan the coefficients of the transform coefficient block for significance map, level and sign encoding beginning (or ending) with the LSC. As other examples, video encoder may select codewords for encoding, or context adaptive entropy encoding modes or contexts, based on the LSC position information.

Figure 9:
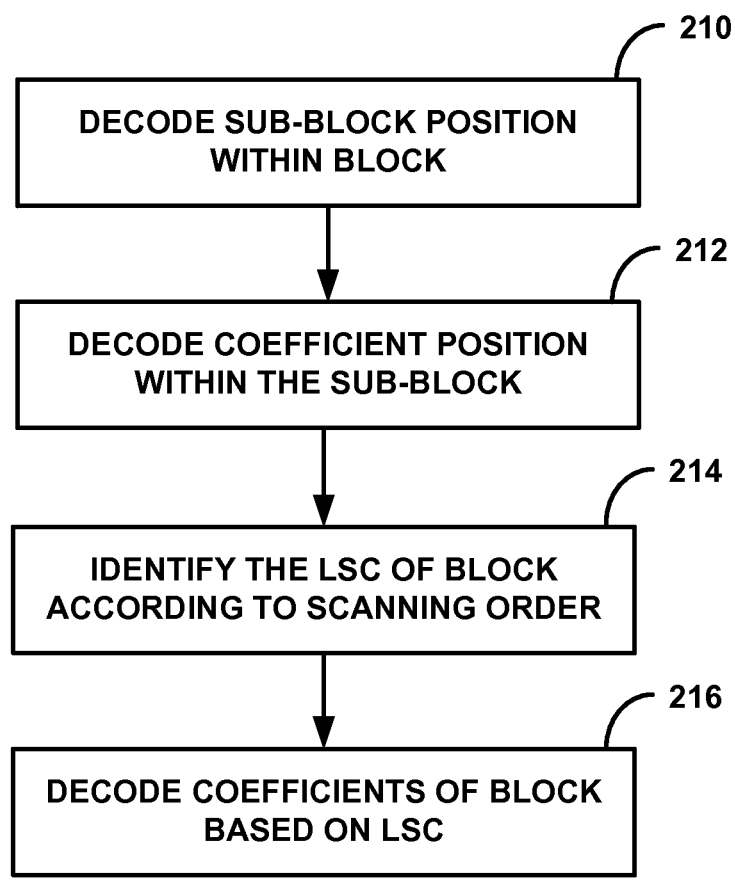
FIG. 9 is a flow diagram illustrating an example method for decoding a block of transform coefficients including two-level decoding of a position of an LSC of the block.

FIG. 9 is a flow diagram illustrating an example method for decoding a block of transform coefficients including two-level decoding of a position of an LSC of the block. According to the example method of FIG. 9, video decoder 30, e.g., entropy decoding unit 150 of the video decoder, decodes a sub-block position within the block of transform coefficients (210). For example, video decoder 30 may decode x- and y-coordinate values for the sub-block position, e.g., syntax elements Last_subblock_X and Last_subblock_Y. In other examples, video decoder 30 may decode an ordinal position or index of the sub-block according to the sub-block scanning order within the block of transform coefficients.

Video decoder 30 also decodes a coefficient position off the LSC within the identified sub-block (212). For example, video decoder 30 may decode x- and y-coordinate values for the coefficient position, e.g., syntax elements last_rem_X and last_rem_Y. In other examples, video decoder 30 may decode an ordinal position or index of the coefficient according to the coefficient scanning order within the sub-block including the LSC. Based on the sub-block position and the coefficient position, video decoder 30 identifies the LSC of the block of transform coefficients according to the scanning order for the block (214). Video decoder 30 may then decode the coefficients of the block of transform coefficients based on the LSC, e.g., as described above with respect to FIG. 7 (216).

Figure 10:
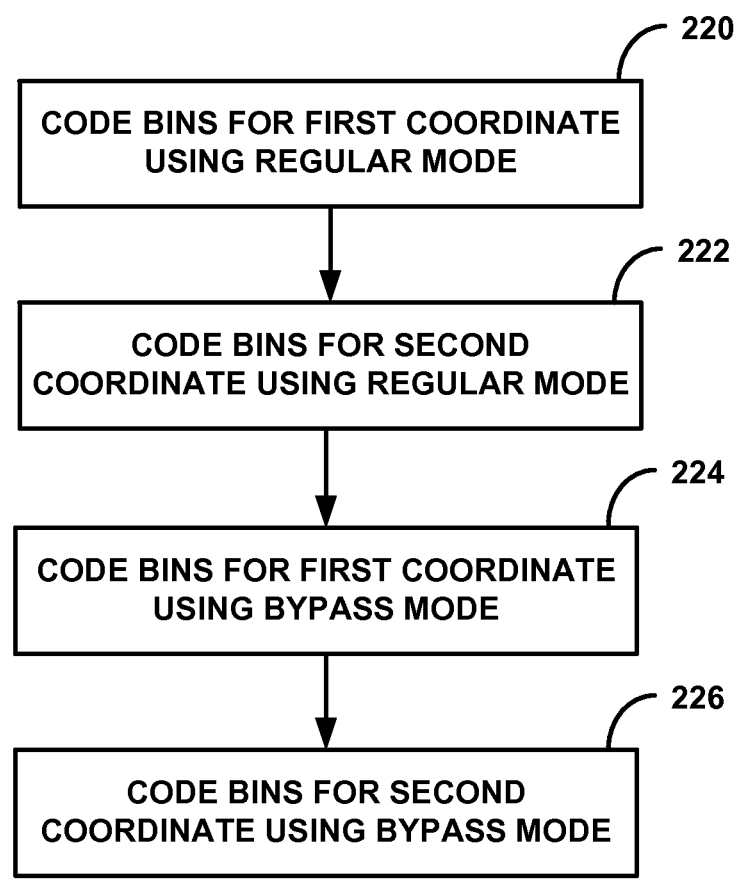
FIG. 10 is a flow diagram illustrating an example method of coding x- and y-coordinates for two-level coding of LSC position.

FIG. 10 is a flow diagram illustrating an example method of coding x- and y-coordinates for two-level coding of LSC position The example method of FIG. 10 may be performed by a video coder, e.g., video encoder 20 or video decoder 30, to code, e.g., encode or decode, x- and y-coordinate LSC position information. In some examples, the method of FIG. 10 may be performed by an entropy encoding unit 118 or an entropy decoding unit 150 to context adaptive entropy encode or decode x- and y-coordinate LSC position information.

According to the example of FIG. 10, the video coder context adaptive entropy codes one or more bins for a first coordinate, e.g., x, using a regular mode that includes coding the bins using determined contexts for the bins (220). The bins may be bins for one or both of the sub-block position, e.g., Last_subblock_X, and the coefficient position, e.g., last_rem_X. The video coder then context adaptive entropy codes one or more bins for the second coefficient, e.g., y, using the regular mode (222). The bins may be bins for one or both of the sub-block position, e.g., Last_subblock_Y, and the coefficient position, e.g., last_rem_Y. The video coder then codes one or more bins for the first coordinate using a bypass mode (224), and the codes one or more bins for the second coefficient using the bypass mode (226).

It should be understood that the operations shown in FIGS. 8-10 are described for purposes of example. That is, the operations shown in FIGS. 8-10 need not necessarily be performed in the order shown, and fewer, additional, or alternative steps may be performed.

The techniques described above may be performed by video encoder 20 (FIGS. 1 and 6) and/or video decoder 30 (FIGS. 1 and 7), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards not yet developed. For example, the techniques for depth coding may also be applicable to other current or future standards requiring coding LSC positions.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding a block of transform coefficients associated with a block of video data during a video decoding process, wherein the block of transform coefficients includes a plurality of sub-blocks, the method comprising:
    decoding information that identifies a position within the block of transform coefficients of one of the coefficients that is a last significant coefficient (LSC) for the block according to a scanning order associated with the block of transform coefficients,
    wherein the scanning order associated with the block of transform coefficients comprises a scanning order of the sub-blocks within the block of transform coefficients and a scanning order of coefficients within the sub-blocks, and
    wherein decoding the information that identifies the position within the block of transform coefficients of the one of the coefficients that is the LSC for the block comprises:
        decoding an LSC sub-block position that identifies a position of one of the sub-blocks that includes the LSC within the block, and
        decoding an LSC coefficient position that identifies a position of the LSC within the sub-block that includes the LSC,
    the method further comprising:
        for each of one or more other sub-blocks of the plurality of sub-blocks, decoding a coefficient position identifying a position of a last significant coefficient within the sub-block according to the scanning order of coefficients within the sub-blocks, and
        decoding the block of transform coefficients based on:
            the position of the LSC for the block identified by the LSC sub-block position and the LSC coefficient position, and
            the position of the last significant coefficient within each of the one or more other sub-blocks of the block.

2. The method of claim 1, wherein at least one of:
    decoding the LSC sub-block position comprises decoding x- and y-coordinates of the sub-block that includes the LSC within the block of transform coefficients,
    decoding the LSC coefficient position comprises decoding x- and y-coordinates of the LSC within the sub-block, or
    decoding the one or more coefficient positions identifying the positions of the one or more last significant coefficient within the one or more other sub-blocks comprises decoding x-and y-coordinates for the one or more last significant coefficients within the one or more other sub-blocks.

3. The method of claim 2, wherein each of the x- and y-coordinates is binarized such that the coordinate comprises a sequence of one or more bins, and wherein decoding the x- and y-coordinates comprises decoding each one or more bins associated with the x- and y-coordinates of the sequence by performing a context adaptive entropy decoding process, including performing one of:

decoding the respective bin using a regular decoding mode that includes determining a context for the bin using a context model, and decoding the bin using the determined context; or decoding the respective bin using a bypass decoding mode that does not include determining a context to decode the bin.

4. The method of claim 3, wherein decoding the x- and y-coordinates comprises, in order:
   decoding a first one or more bins for a first one of the coordinates for at least one of the sub-block position or the coefficient position using the regular decoding mode;
   decoding a first one or more bins for a second one of the coordinates for at least one of the sub-block position or the coefficient position using the regular decoding mode;
   decoding a second one or more bins for the first coordinate for at least one of the sub-block position or the coefficient position using the bypass decoding mode; and
   decoding a second one or more bins for the second coordinate for at least one of the sub-block position or the coefficient position using the bypass decoding mode.

5. The method of claim 3,
   wherein at least one bin associated with one of the coordinates corresponds to another bin associated with the other coordinate, and
   wherein at least one pair of corresponding bins for the x- and y-coordinates shares a context for context adaptive entropy decoding using the regular decoding mode.

6. The method of claim 1,
   wherein at least one of:
      decoding the LSC sub-block position comprises decoding an index of the sub-block that includes the LSC according to the scanning order of the sub-blocks within the block of transform coefficients, or
      decoding the LSC coefficient position comprises decoding an index of the LSC according to a scanning order of coefficients within the sub-blocks.

7. The method of claim 1, wherein decoding the LSC sub-block position and the LSC coefficient position comprises:
   if the LSC sub-block position is less than a threshold, decoding the LSC coefficient position using one of a unary codeword or truncated unary codeword; and
   if the LSC sub-block position is greater than or equal to the threshold, decoding the LSC coefficient position using a fixed length codeword.

8. The method of claim 1, wherein each of the LSC sub-block position and the LSC coefficient position is binarized such that the position comprises a sequence of one or more bins, and wherein decoding the LSC sub-block position and the LSC coefficient position comprises decoding each one or more bins associated with the LSC sub-block position and the LSC coefficient position by performing a context adaptive entropy decoding process, including performing one of:
   decoding the respective bin using a regular decoding mode that includes determining a context for the bin using a context model, and decoding the bin using the determined context; or
   decoding the respective bin using a bypass decoding mode that does not include determining a context to decode the bin.

9. The method of claim 8, wherein decoding the LSC sub-block position and the LSC coefficient position comprises:
   if the LSC sub-block position is less than a threshold, decoding the one or more bins of the LSC coefficient position using the regular decoding mode; and
   if the LSC sub-block position is greater than or equal to the threshold, decoding the one or more bins of the LSC coefficient position using at least one of the regular decoding mode or the bypass decoding mode.

10. The method of claim 8,
    wherein at least one of the bins of the LSC sub-block position corresponds to at least one of the bins of the LSC coefficient position, and
    wherein at least one pair of corresponding bins for the LSC sub-block position and the LSC coefficient position share a context for context adaptive entropy decoding according to the regular decoding mode.

11. The method of claim 1, wherein decoding the information that identifies the position of the LSC within the block according to the scanning order associated with the block further comprises:
    converting the LSC sub-block position and the LSC coefficient position into x- and y-coordinates of the LSC within the block;
    converting the x- and y-coordinates into a one dimensional index of the LSC within the block according to the scanning order associated with the block using one or more formulas.

12. A method of encoding a block of transform coefficients associated with a block of video data during a video encoding process, wherein the block of transform coefficients includes a plurality of sub-blocks, the method comprising:
    encoding information that identifies a position within the block of transform coefficients of one of the coefficients that is a last significant coefficient (LSC) for the block according to a scanning order associated with the block of transform coefficients,
    wherein the scanning order associated with the block of transform coefficients comprises a scanning order of the sub-blocks within the block of transform coefficients and a scanning order of coefficients within the sub-blocks, and
    wherein encoding the information that identifies the position within the block of transform coefficients of the one of the coefficients that is the LSC for the block comprises:
       encoding an LSC sub-block position that identifies a position of one of the sub-blocks that includes the LSC within the block, and
       encoding an LSC coefficient position that identifies a position of the LSC within the sub-block that includes the LSC,
    the method further comprising:
       for each of one or more other sub-blocks of the plurality of sub-blocks, encoding a coefficient position identifying a position of a last significant coefficient within the sub-block according to the scanning order of coefficients within the sub-blocks, and
       encoding the block of transform coefficients based on:
          the position of the LSC for the block identified by the LSC sub-block position and the LSC coefficient position, and
          the position of the last significant coefficient within each of the one or more other sub-blocks of the block.

13. The method of claim 12, wherein at least one of:
encoding the LSC sub-block position comprises encoding x- and y-coordinates of the sub-block that includes the LSC within the block of transform coefficients,
encoding the LSC coefficient position comprises encoding x- and y-coordinates of the LSC within the sub-block, or
encoding the one or more coefficient positions identifying the positions of the one or more last significant coefficient within the one or more other sub-blocks comprises encoding x- and y-coordinates for the one or more last significant coefficients within the one or more other sub-blocks.

14. The method of claim 13, wherein each of the x- and y-coordinates is binarized such that the coordinate comprises a sequence of one or more bins, and wherein encoding the x- and y-coordinates comprises encoding each one or more bins associated with the x- and y-coordinates of the sequence by performing a context adaptive entropy encoding process, including performing one of:
encoding the respective bin using a regular encoding mode that includes determining a context for the bin using a context model, and encoding the bin using the determined context; or
encoding the respective bin using a bypass encoding mode that does not include determining a context to encode the bin.

15. The method of claim 14, wherein encoding the x- and y-coordinates comprises, in order:
encoding a first one or more bins for a first one of the coordinates for at least one of the sub-block position or the coefficient position using the regular encoding mode;
encoding a first one or more bins for a second one of the coordinates for at least one of the sub-block position or the coefficient position using the regular encoding mode;
encoding a second one or more bins for the first coordinate for at least one of the sub-block position or the coefficient position using the bypass encoding mode; and
encoding a second one or more bins for the second coordinate for at least one of the sub-block position or the coefficient position using the bypass encoding mode.

16. The method of claim 14,
wherein at least one bin associated with one of the coordinates corresponds to another bin associated with the other coordinate, and
wherein at least one pair of corresponding bins for the x- and y-coordinates shares a context for context adaptive entropy encoding using the regular encoding mode.

17. The method of claim 12,
wherein at least one of:
encoding the LSC sub-block position comprises encoding an index of the sub-block that includes the LSC according to the scanning order of the sub-blocks within the block of transform coefficients, or
encoding the LSC coefficient position comprises encoding an index of the LSC according to a scanning order of coefficients within the sub-blocks.

18. The method of claim 12, wherein encoding the LSC sub-block position and the LSC coefficient position comprises:
comparing the LSC sub-block position to a threshold;
if the LSC sub-block position is less than the threshold, encoding the LSC coefficient position using one of a unary codeword or truncated unary codeword; and
if the LSC sub-block position is greater than or equal to the threshold, encoding the LSC coefficient position using a fixed length codeword.

19. The method of claim 12, wherein each of the LSC sub-block position and the LSC coefficient position is binarized such that the position comprises a sequence of one or more bins, and wherein encoding the LSC sub-block position and the LSC coefficient position comprises encoding each one or more bins associated with the LSC sub-block position and the LSC coefficient position by performing a context adaptive entropy encoding process, including performing one of:
encoding the respective bin using a regular encoding mode that includes determining a context for the bin using a context model, and encoding the bin using the determined context; or
encoding the respective bin using a bypass encoding mode that does not include determining a context to encode the bin.

20. The method of claim 19, wherein encoding the LSC sub-block position and the LSC coefficient position comprises:
comparing the LSC sub-block position to a threshold;
if the LSC sub-block position is less than the threshold, encoding the one or more bins of the LSC coefficient position using the regular encoding mode; and
if the LSC sub-block position is greater than or equal to the threshold, encoding the one or more bins of the LSC coefficient position using at least one of the regular encoding mode or the bypass encoding mode.

21. The method of claim 19,
wherein at least one of the bins of the LSC sub-block position corresponds to at least one of the bins of LSC coefficient position, and
wherein at least one pair of corresponding bins for the LSC sub-block position and the LSC coefficient position share a context for context adaptive entropy encoding according to the regular encoding mode.

22. The method of claim 12, wherein encoding the information that identifies the position of the LSC within the block according to the scanning order associated with the block further comprises:
identifying a one-dimensional index of the LSC within the block according to the scanning order associated with the block;
converting the one dimensional index of the LSC into x- and y-coordinates of the LSC using one or more formulas; and
converting the x- and y-coordinates into the LSC sub-block position and the LSC coefficient position.

23. A device comprising:
a memory configured to store video data and
a video coder configured to code a block of transform coefficients associated with a block of the video data during a video coding process, wherein the block of transform coefficients includes a plurality of sub-blocks, and wherein the video coder is configured to:
code information that identifies a position within the block of transform coefficients of one of the coefficients that is a last significant coefficient (LSC) for the block according to a scanning order associated with the block of transform coefficients,
wherein the scanning order associated with the block of transform coefficients comprises a scanning order of the sub-blocks within the block of transform coefficients and a scanning order of coefficients within the sub-blocks, and wherein, to code the information that identifies the position within the block of transform coefficients of the one of the coefficients that is the LSC for the block, the video coder is configured to:

code an LSC sub-block position that identifies a position of one of the sub-blocks that includes the LSC within the block, and code an LSC coefficient position that identifies a position of the LSC within the sub-block that includes the LSC, wherein the video coder is further configured to:

for each of one or more other sub-blocks of the plurality of sub-blocks, code a coefficient position identifying a position of a last significant coefficient within the sub-block according to the scanning order of coefficients within the sub-blocks, and code the block of transform coefficients based on:
the position of the LSC for the block identified by the LSC sub-block position and the LSC coefficient position, and
the position of the last significant coefficient within each of the one or more other sub-blocks of the block.

24. The device of claim 23, wherein the video coder is configured to at least one of:
code x- and y-coordinates of the sub-block that includes the LSC within the block of transform coefficients as the LSC sub-block position,
code x- and y-coordinates of the LSC within the sub-block as the LSC coefficient position, or
code the one or more coefficient positions identifying the positions of the one or more last significant coefficient within the one or more other sub-blocks by decoding x- and y-coordinates for the one or more last significant coefficients within the one or more other sub-blocks.

25. The device of claim 24, wherein each of the x- and y-coordinates is binarized such that the coordinate comprises a sequence of one or more bins, wherein the video coder codes each one or more bins associated with the x- and y-coordinates of the sequence by performing a context adaptive entropy coding process, and wherein to perform the context adaptive entropy coding process the video coder at least one of:
codes the respective bin using a regular coding mode that includes determining a context for the bin using a context model, and codes the bin using the determined context; or
codes the respective bin using a bypass coding mode that does not include determining a context to code the bin.

26. The device of claim 25, wherein, to code the x- and y-coordinates, the video coder is configured to, in order:
code a first one or more bins for a first one of the coordinates for at least one of the sub-block position or the coefficient position using the regular decoding mode;
code a first one or more bins for a second one of the coordinates for at least one of the sub-block position or the coefficient position using the regular decoding mode;
code a second one or more bins for the first coordinate for at least one of the sub-block position or the coefficient position using the bypass decoding mode; and code a second one or more bins for the second coordinate for at least one of the sub-block position or the coefficient position using the bypass decoding mode.

27. The device of claim 25,
wherein at least one bin associated with one of the coordinates corresponds to another bin associated with the other coordinate, and
wherein at least one pair of corresponding bins for the x- and y-coordinates shares a context for context adaptive entropy coding using the regular coding mode.

28. The device of claim 23,
wherein the video coder is configured to at least one of:
code an index of the sub-block that includes the LSC according to the scanning order of the sub-blocks within the block of transform coefficients as the LSC sub-block position, or
code an index of the LSC according to a scanning order of coefficients within the sub-blocks as the LSC coefficient position.

29. The device of claim 23, wherein the video coder is further configured to:
if the LSC sub-block position is less than a threshold, code the LSC coefficient position using one of a unary codeword or truncated unary codeword; and
if the LSC sub-block position is greater than or equal to the threshold, code the LSC coefficient position using a fixed length codeword.

30. The device of claim 23, wherein each of the LSC sub-block position and the LSC coefficient position is binarized such that the position comprises a sequence of one or more bins, and wherein the video coder is configured to code each one or more bins associated with the sub-block position and the coefficient position by performing a context adaptive entropy decoding process, including performing one of:
coding the respective bin using a regular decoding mode that includes determining a context for the bin using a context model, and decoding the bin using the determined context; or
coding the respective bin using a bypass decoding mode that does not include determining a context to decode the bin.

31. The device of claim 30, wherein the video coder is configured to:
if the LSC sub-block position is less than a threshold, code the one or more bins of the LSC coefficient position using the regular decoding mode; and
if the LSC sub-block position is greater than or equal to the threshold, code the one or more bins of the LSC coefficient position using at least one of the regular decoding mode or the bypass decoding mode.

32. The device of claim 30,
wherein at least one of the bins of the LSC sub-block position corresponds to at least one of the bins of LSC coefficient position, and
wherein at least one pair of corresponding bins for the LSC sub-block position and the LSC coefficient position share a context for context adaptive entropy coding according to the regular coding mode.

33. The device of claim 23, wherein the device comprises at least one of:
an integrated circuit implementing the video coder;
a microprocessor implementing the video coder; and
a wireless communication device including the video coder.

34. A device for coding a block of transform coefficients associated with a block of video data during a video decoding process, wherein the block of transform coefficients includes a plurality of sub-blocks, the device comprising:
  means for coding information that identifies a position within the block of transform coefficients of one of the coefficients that is a last significant coefficient (LSC) for the block according to a scanning order associated with the block of transform coefficients,
  wherein the scanning order associated with the block of transform coefficients comprises a scanning order of the sub-blocks within the block of transform coefficients and a scanning order of coefficients within the sub-blocks, and
  wherein the means for coding the information that identifies the position within the block of transform coefficients of the one of the coefficients that is the LSC for the block comprises:
    means for coding an LSC sub-block position that identifies a position of one of the sub-blocks that includes the LSC within the block, and
    means for coding an LSC coefficient position that identifies a position of the LSC within the sub-block that includes the LSC,
  wherein the device further comprises:
    for each of one or more other sub-blocks of the plurality of sub-blocks, means for coding a coefficient position identifying a position of a last significant coefficient within the sub-block according to the scanning order of coefficients within the sub-blocks, and
    means for coding the block of transform coefficients based on:
      the position of the LSC identified by the sub-block position and the coefficient position, and
      the position of the last significant coefficient within each of the one or more other sub-blocks of the block.

35. The device of claim 34, wherein at least one of:
  the means for coding the LSC sub-block position comprises means for coding x- and y-coordinates of the sub-block that includes the LSC within the block of transform coefficients,
  the means for coding the LSC coefficient position comprises means for coding x- and y-coordinates of the LSC within the sub-block, or
  decoding the one or more coefficient positions identifying the positions of the one or more last significant coefficient within the one or more other sub-blocks comprises decoding x- and y-coordinates for the one or more last significant coefficients within the one or more other sub-blocks.

36. The device of claim 34,
  wherein at least one of:
    the means for coding the LSC sub-block position comprises means for coding an index of the sub-block that includes the LSC according to the scanning order of the sub-blocks within the block of transform coefficients, or
    the means for coding the LSC coefficient position comprises means for coding an index of the LSC according to a scanning order of coefficients within the sub-blocks.

37. A computer-readable storage medium having instructions stored thereon that, when executed by one or more processors of a video coder configured to code a block of transform coefficients associated with a block of video data during a video decoding process, wherein the block of transform coefficients includes a plurality of sub-blocks, cause the video coder to:
  code information that identifies a position within the block of transform coefficients of one of the coefficients that is a last significant coefficient (LSC) for the block according to a scanning order associated with the block of transform coefficients,
  wherein the scanning order associated with the block of transform coefficients comprises a scanning order of the sub-blocks within the block of transform coefficients and a scanning order of coefficients within the sub-blocks, and
  wherein the instructions that cause the video coder to code the information that identifies the position within the block of transform coefficients of the one of the coefficients that is the LSC for the block comprise instructions that cause the video coder to:
    code an LSC sub-block position that identifies a position of one of the sub-blocks that includes the LSC within the block, and
    code an LSC coefficient position that identifies a position of the LSC within the sub-block that includes the LSC,
  wherein the instructions further cause the video coder to:
    for each of one or more other sub-blocks of the plurality of sub-blocks, code a coefficient position identifying a position of a last significant coefficient within the sub-block according to the scanning order of coefficients within the sub-blocks, and
    code the block of transform coefficients based on:
      the position of the LSC identified by the LSC sub-block position and the LSC coefficient position, and
      the position of the last significant coefficient within each of the one or more other sub-blocks of the block.

38. The computer-readable storage medium of claim 37, wherein at least one of:
  the instructions that cause the video coder to code the LSC sub-block position comprise instructions that cause the video coder to code x- and y-coordinates of the sub-block that includes the LSC within the block of transform coefficients, or
  the instructions that cause the video coder to code the LSC coefficient position comprise instructions that cause the video coder to code x- and y-coordinates of the LSC within the sub-block.

39. The computer-readable storage medium of claim 37, wherein at least one of:
  the instructions that cause the video coder to code the LSC sub-block position comprise instructions that cause the video coder to code an index of the sub-block that includes the LSC according to the scanning order of the sub-blocks within the block of transform coefficients, or
  the instructions that cause the video coder to code the LSC coefficient position comprise instructions that cause the video coder to code an index of the LSC according to a scanning order of coefficients within the sub-blocks.

* * * * *